(12) United States Patent
Russell et al.

(10) Patent No.: US 10,605,456 B2
(45) Date of Patent: Mar. 31, 2020

(54) REFRACTORY INSERT MEMBERS, REFRACTORY BLOCK ASSEMBLY INCLUDING SAME AND REFORMER FLUE GAS TUNNEL ASSEMBLY INCLUDING SAME

(71) Applicant: BLASCH PRECISION CERAMICS, INC., Albany, NY (US)

(72) Inventors: William P. Russell, Watervliet, NY (US); Joseph D. Quintiliani, Troy, NY (US); Jeffrey J. Bolebruch, Amsterdam, NY (US)

(73) Assignee: Blasch Precision Ceramics, Inc., Albany, NY (US)

( * ) Notice: Subject to any disclaimer, the term of this patent is extended or adjusted under 35 U.S.C. 154(b) by 46 days.

(21) Appl. No.: 15/772,326

(22) PCT Filed: Nov. 10, 2016

(86) PCT No.: PCT/US2016/061307
§ 371 (c)(1),
(2) Date: Apr. 30, 2018

(87) PCT Pub. No.: WO2017/083506
PCT Pub. Date: May 18, 2017

(65) Prior Publication Data
US 2018/0313539 A1  Nov. 1, 2018

Related U.S. Application Data

(60) Provisional application No. 62/254,923, filed on Nov. 13, 2015.

(51) Int. Cl.
*F23M 5/02* (2006.01)
*F23M 5/04* (2006.01)
(Continued)

(52) U.S. Cl.
CPC .......... *F23M 5/02* (2013.01); *B01J 19/2415* (2013.01); *E04B 2/16* (2013.01); *F23M 5/04* (2013.01);
(Continued)

(58) Field of Classification Search
CPC .. F23M 5/02; F23M 5/04; F23M 5/06; F23M 5/08; F23M 2700/0053; F23M 2700/0056; F27D 1/08; C03B 5/2375; C10B 29/02
See application file for complete search history.

(56) References Cited

U.S. PATENT DOCUMENTS 990,119 A  *  4/1911  Diamond ................... 52/591.5
1,773,729 A  *  8/1930  Hall ........................ F23M 5/00
52/566

(Continued)

FOREIGN PATENT DOCUMENTS

FR          2 533 956 A1    4/1984
WO      2015/057345 A1    4/2015
(Continued)

OTHER PUBLICATIONS

English Translation of International Preliminary Report on Patentability, International Application No. PCT/US2016/061307, dated May 24, 2018 (9 pages).
(Continued)

*Primary Examiner* — David J Laux
(74) *Attorney, Agent, or Firm* — Burr & Brown, PLLC

(57) ABSTRACT

A refractory block assembly for a steam reformer furnace tunnel includes a hollow main body, at least one first mechanical mating member defining a protruded portion extending from an upper surface of the main body, at least one second corresponding mechanical mating member defining an opening corresponding to the protruded portion
(Continued)

formed in a portion of a lower surface of the main body, and at least one through-hole having openings formed in a first side and an opposed second side of the main body portion. A refractory insert member having mechanical mating features on at least a portion of the outer surface thereof resides within the at least one though-hole of the refractory block.

6 Claims, 33 Drawing Sheets

(51) Int. Cl.
*F23M 5/06* (2006.01)
*F23M 5/08* (2006.01)
*F27D 1/04* (2006.01)
*E04B 2/16* (2006.01)
*B01J 19/24* (2006.01)

(52) U.S. Cl.
CPC .............. *F23M 5/06* (2013.01); *F23M 5/08* (2013.01); *F27D 1/04* (2013.01); *F27D 1/042* (2013.01); *E04B 2103/02* (2013.01)

(56) References Cited

U.S. PATENT DOCUMENTS

| | | | | |
|---|---|---|---|---|
| 2,241,169 A * | 5/1941 | Yokes | ............... | E04B 1/12 52/223.7 |
| 2,532,990 A * | 12/1950 | Blaha | ............... | F23M 5/025 431/348 |
| 3,269,070 A * | 8/1966 | Stoy | ............... | F23M 5/06 52/249 |
| 3,568,611 A | 3/1971 | Konrad et al. | | |
| 4,115,980 A * | 9/1978 | Martel | ............... | E04B 2/46 446/124 |
| 5,623,797 A * | 4/1997 | Gravier | ............... | E01F 8/0017 52/284 |
| 5,899,040 A * | 5/1999 | Cerrato | ............... | E04B 2/08 52/223.7 |
| 6,138,426 A * | 10/2000 | Mork | ............... | E04B 1/703 52/293.2 |
| 6,244,009 B1 * | 6/2001 | Cerrato | ............... | E04B 2/08 52/223.7 |
| 6,550,208 B2 * | 4/2003 | Nanayakkara | ............... | E04B 2/14 52/223.7 |
| 6,665,994 B1 * | 12/2003 | Ruggeri | ............... | E04B 2/14 52/592.6 |
| 7,305,803 B2 * | 12/2007 | Correa | ............... | E04B 2/16 52/503 |
| 7,610,730 B2 * | 11/2009 | O'Connor | ............... | E04B 2/16 52/442 |
| 8,439,102 B1 | 5/2013 | Collins, III et al. | | |
| 8,800,230 B2 * | 8/2014 | O'Connor | ............... | E04B 2/16 52/442 |
| 10,155,210 B2 * | 12/2018 | Russell | ............... | E04B 2/16 |
| 10,329,911 B2 * | 6/2019 | Skidmore | ............... | E21F 17/103 |
| 2005/0252145 A1 * | 11/2005 | MacDonald | ............... | E04B 2/16 52/606 |
| 2006/0242914 A1 * | 11/2006 | Stephansky | ............... | E04B 2/06 52/27 |
| 2007/0028817 A1 | 2/2007 | Parker | | |
| 2018/0216887 A1 * | 8/2018 | Barnett | ............... | F27B 9/34 |

FOREIGN PATENT DOCUMENTS

WO 2015/188030 A1 12/2015
WO 2017/058744 A2 4/2017

OTHER PUBLICATIONS

International Search Report and Written Opinion, International Application No. PCT/US2016/061307, dated Mar. 3, 2017 (12 pages).
"Nitrogen+Syngas No. 336, Jul./Aug. 2015" (www.NitrogenandSyngas.com), dated Sep. 9, 2015, entire document, especially pp. 59-61.
http://www.blaschceramics.com/products/stablox-flue-gas-tunnel-system/.
"Blasch StaBlox: Install your next SMR Flue Gas Tunnel in less than one-third the time" (Blasch Precision Ceramics), entire document, https://www.youtube.com/watch?v=pgQJPCAa6WY>.
Partial European Search Report, European Application No. 16864993.7, dated Jun. 6, 2019 (12 pages).

* cited by examiner

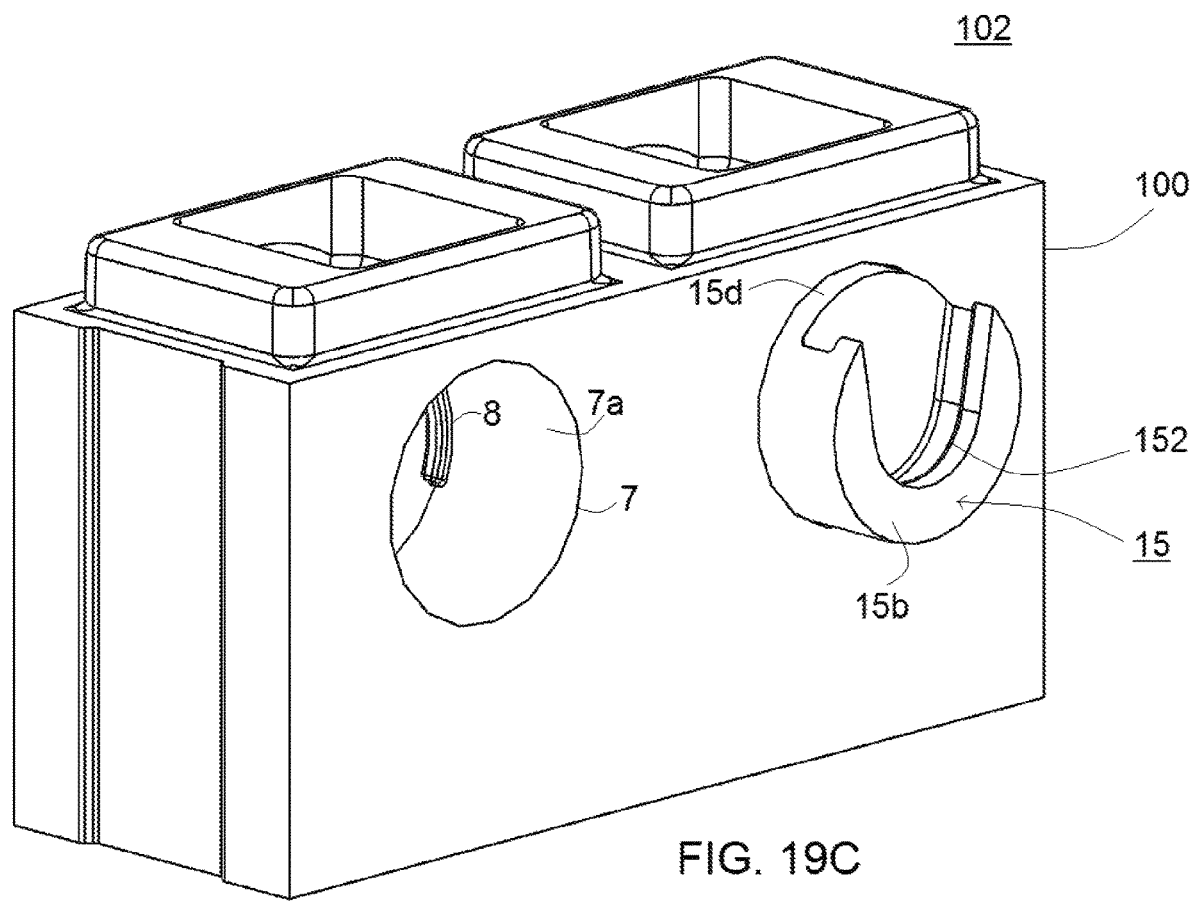

REFRACTORY INSERT MEMBERS, REFRACTORY BLOCK ASSEMBLY INCLUDING SAME AND REFORMER FLUE GAS TUNNEL ASSEMBLY INCLUDING SAME

This application claims the benefit under 35 USC § 119(a)-(d) of U.S. Provisional Application No. 62/254,923 filed on Nov. 13, 2015, the entire contents of which are incorporated herein by reference.

FIELD OF THE INVENTION

The present invention relates to refractory insert members for refractory blocks and refractory block assemblies including those insert members, for use in connection with a refractory tunnel, also known as a reformer flue gas tunnel, of a hydrogen reformer furnace, which is used in steam methane reformer processes. More specifically, the present invention provides refractory insert members that are installed in refractory blocks and which improve the structural stability of the tunnel walls or provide improved gas flow control. The refractory insert members and refractory block assemblies including those refractory insert members are preferably in connection with a light-weight, free-standing tunnel structure that is constructed without the use of mortar, that better withstands the application of hydrogen reformers, and which includes refractory components having a more mechanically robust design and made of higher performance material than that which has been used heretofore.

BACKGROUND OF THE INVENTION

A hydrogen reformer furnace converts natural gas into hydrogen through a series of catalytic reactions. One of the most prevalent routes for the conversion of methane ($CH_4$) to petrochemicals is either through the manufacture of hydrogen, or a mixture of hydrogen and carbon monoxide. This hydrogen/carbon monoxide material is referred to as "Synthesis Gas" or "Syngas." Indeed, steam methane reforming (SMR) of natural gas or syngas is the most common method of producing commercial bulk hydrogen as well as hydrogen that is used in the industrial synthesis of ammonia. At temperatures around 1000° C., and in the presence of metal-based catalysts, steam reacts with methane to yield carbon monoxide and hydrogen. These two reactions are reversible in nature:

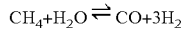

$$CH_4 + H_2O \rightleftharpoons CO + 3H_2$$

The reaction is endothermic and requires the input of large amounts of heat in order to be sustained. Heating gas accounts for 80% of the total process gas requirement.

A common type of hydrogen reformer furnaces is known as a "top down," or "down fired" furnace. FIG. 1 is a perspective cut-view of a conventional hydrogen reformer furnace 800. Natural gas burners (not shown) are spaced at the top of the furnace 800 in between rows (also known as lanes) of catalyst pipes 70, and produce heat through combustion. The burners fire downward, parallel to the hydrocarbon-steam mixture flow, direction through the catalyst tubes 70, which are centrifugally cast chrome-nickel tubes that are typically 10-40 feet long, and mounted vertically in the furnace 800. The tubes 70 contain an activated nickel catalyst on alumina carriers in the form of pellets or balls, for example. The process gas and steam are fed downward over the catalyst and removed from the bottom of the tubes 70.

The primary reformer operates at temperatures in the 700-800° C. range. The hot gas is then passed into a convective heat transfer zone, and steam is generated and may be fed back into the primary reformer. This unit is used to produce synthetic fuel that may be turned into a variety of liquid fuels for powering internal combustion engines. It is also often used to produce hydrogen for other processes in the plant burner whereby flame and hot gas radiation provide heat input to the tubes to support the highly endothermic reaction. The air exits out one side of the bottom of the furnace 800. Based on the location of the burners and the furnace exit, the air flow and heat distribution are non-uniform. In this situation, it is common for the hot gasses with flow directly to the exit, creating a cold area in the back of the unit and a hot spot just before the exit which can reach temperatures high enough to damage the catalyst tubes. In order to correct for this, flue gas tunnels 80 are provided, which act as collection ducts for the combustion gases, promoting even heat distribution in order to improve efficiency and prolong the life of the tubes 70.

While SMR is a well-established process, and efforts have been made over time to optimize many facets of the technology in order to increase efficiency, most of the focus has been centered on improving aspects of these reformers with respect to the catalyst, metal alloys, burners, feed stocks, etc. However, one piece of SMR technology has been completely ignored where advancements are concerned. That is, the refractory designs used in the construction of these units have remained stagnant for decades. In particular, the flue gas tunnels which transport combustion gasses through the fired heaters have not been changed despite the clear need for improvement based on performance reliability issues.

These tunnels 80 average about 8 feet in height, 3 feet in width and run the full length of the furnace unit 100 (e.g., 40 ft-50 ft). Because of the size of these tunnels 80 and the volume of refractory materials used in their construction, they have traditionally been fabricated using basic brick shapes (e.g., standard rectangular shapes, shown in FIG. 2), in a similar manner to constructing any structural brick wall. The walls 81 of the tunnels 80 are then topped with a series of rectangular blocks 82 that form a lid (see, e.g., FIGS. 1-3). Historically, conventional tunnel walls 81 have been very prone to mechanical failure under heat and over time. The main modes of failure for these flue tunnels are related to refractory design, installation technique, mechanical abuse in service, and initial material selection.

Even though they are problematic, these tunnels 80 are essential in order for the furnace unit 800 heat evenly and achieve the required efficiency. For example, if a down fired reformer did not include such tunnels 80 in its unit construction, all of the combustion gasses would rush into the flue at the exit of the reformer. This would create uneven temperatures throughout the unit with cold areas away from the flue and hot spots near the exit of the unit, as discussed above. As a result, the reformer would not only experience reduced efficiency, but would also overheat the catalyst tubes near the exit, causing premature failure to occur.

The design and construction of conventional flue gas tunnels 80 in SMRs involves the use of flat bricks with typical dimensions of 3 in×9 in×6.5 in. The walls 81 are constructed so that half blocks are left out in regular patterns to allow for gas passage through the wall 81 into the tunnel 80 (not shown). Typically, the bricks are mortared in place during construction in order to hold the walls 81 together. A common alternative to the standard flat brick is a standard tongue and groove brick 83, 84 (see, e.g., FIGS. 4 and 5). While many sizes and configurations of these types of bricks exist, such conventional bricks typically use a simple tongue and groove feature to mechanically engage each other when vertically stacked in the common manner. As shown in FIGS. 4 and 5, conventional bricks 83, 84 include simple tongue 832, 842 and groove-style mating features 833, 843 that fit together when vertically stacked.

In the past, in conventional tunnel structures, large expansion gaps have been provided, located every 6-10 ft along the tunnel walls in order to account for thermal expansion in the system. The expansion gap is a critical aspect of design and construction, because the anticipated thermal growth must be accommodated. In this case, however, due to the presence of these large expansion gaps, every tunnel is actually made up of several large free-standing walls. In order to help support these free-standing sections of tunnel wall, intermediate support walls or pilasters are therefore also provided (not shown). These intermediate support walls connect the outer walls of tunnels between catalyst tubes in order to prevent the walls from leaning or collapsing. Pilasters, also known as buttresses, serve the same purpose, and are structured as columns of bricks located outside of the tunnel walls (not shown).

Another feature of the tunnel wall construction is the end wall (not shown). Also known as cross-over walls or target walls, these brick wall segments connect tunnels at the exit of the unit, preventing gas by-pass through the surrounding lining. In addition to providing additional lateral support, the end walls also ensure that all combustion gasses properly exit through the flue gas tunnels 80.

Once the tunnel walls are constructed, the tunnel covers (lids) are placed on top. These covers, often called coffin covers, are typically made from large slabs of refractory material. However simple the design may be, they serve an important purpose, because failed covers decrease the unit efficiency, cause tunnel wall failure as they fall, and contribute to shorter tube life. There are four main styles of coffin covers. The main style is a rectangular or square solid design (see, e.g., lid 82 in FIG. 3). This represents the traditional approach, and is simply a solid slab of refractory material that spans the horizontal distance (gap) between walls 81. These solid covers 82 can also have a notched surface or otherwise be formed with a mating feature on the bottom or sides that can mechanically engage with the tunnel walls and provide additional support (not shown). Another style is the hollow or extruded lid 821 (see, e.g., FIGS. 6 and 7). These types of covers 821 have the same outer dimensions as the rectangular solid lid 82, but include a pair of hollowed-out sections (cavities) 822 in the middle to reduce the weight of the lid and the resulting stresses.

Another common cover design is the off-set cover 831, as shown in FIG. 8. This solid lid features a slanted geometry that facilitates engagement between adjacent covers, which offers extra support during upsets and which can help support cracked lids in the event of a cover failure. FIG. 9 shows a tongue and groove cover 851, which is a another version of the off-set cover 831, but whose mechanical mating features (i.e., tongue 851$a$, and groove 851$b$) provide even more engagement with adjacent lids 851.

One of the current types of failures seen in the field is the collapsing of a section of lids, or all of the lids, over the entire length of the tunnel. Once installed, the lids act as a beam, and a crack in the middle of the lid is often the result of the ratio between the span and the material thickness. The cross-section (thickness) of the replacement lids is then increased, but after another campaign, the failure is typically even worse than before. This is because the lid failure is not a result of static load. Hand calculations coupled with computer simulation have shown that the static load alone imparts very little stress on the lids, and will not result in a failure. Computer run finite element analysis (FEA) of a 9 in W×9 in T×42 in L solid rectangular lid (see, e.g., FIG. 3) installed on a tunnel at a constant service temperature of 1900° F. demonstrated that the lid has no external forces acting upon it other than its own weight. The result is a maximum stress of a very modest 10 psi.

With many materials, the modulus of rupture (MOR) decreases significantly at higher temperatures, and it is possible to select a low grade refractory lid material whose MOR decreases at operational excursion temperatures to a point that even the mild stresses associated with the static load can result in failure. However, most engineered refractory material suppliers characterize the hot modulus of rupture (HMOR), and supply a material option for lids that have a high enough HMOR so that even with the decrease in strength, the static loads still have a very significant factor of safety associated therewith. Based on the comparison of the FEA results to the published HMOR, it has been concluded that most lid failure is not a result of static load alone, and is therefore a result of stresses associated with the thermal state.

Thermal stresses in such a situation manifest several ways. One way the components can fail is if the thermal expansion is not properly managed, resulting in excessive compressional force. Since the lids are placed on top of the wall sections and the only constriction is either friction or mortar, the thermal expansion will not be constricted to the point of failure. The HMOR of commonly used refractory mortars is roughly 500 psi, well below that of the refractory material selected for the tunnel lid, so if the thermal stresses reach that level, the mortar will break and the lid will be free to expand as necessary.

The component can also fail as a result of thermal stress that occurs as a result of any temperature differential incurred during operation, and is not limited to instances of large upsets. Thermal stress failure results when the thermal expansion from one area of a component is different from another area resulting in a stress greater than the yield strength of the material. If the temperature in the convection section of the furnace is different than the temperature inside the tunnels, even for a short period of time, the potential for thermal stress is present. FEA of a 9 in W×9 in T×42 in L solid rectangular lid (see, e.g., FIG. 3) installed on a tunnel with a temperature on the top surface of the lid at 1910° F. and a temperature on the bottom surface of the lid at 1900° F. has shown that the lid has no external forces acting upon it, other than its own weight. A differential temperature of 10 degrees across the lid results in a max stress of 1500 psi, which is above the HMOR of lower end refractory materials. In a situation where a very large number of the lids of a tunnel all failed during the same campaign without any of the walls collapsing, it is most likely that the mode of failure was thermal stress.

Another important factor in the performance of the tunnel lids is the material's creep resistance. Creep occurs when a material slowly but permanently deforms under long term exposure to high levels of stress that are below the material yield strength. The result on the tunnel walls is a transmission of the lids mass in the vertical direction, which compliments the strength and structure of the wall. Creep of a lid will result in a "sagging" of the center span and will change the interaction force between the lid and the tunnel walls, and eventually lead to a failure. Creep can be characterized with ASTM standard testing, which is representative of the use of a tunnel lid in service and is an important component to material selection. ASTM tests on Super Duty Brick have published results of a 7.86% deflection at 2,600° F. The result on the tunnel walls is a transmission of the lids mass at an angle that is a few degrees off of the vertical axis and which encourages the walls to separate further apart from one another at the top than at the bottom.

A full tunnel collapse can actually be the result of several different modes of failure. Conventional tunnel construction uses hundreds of thousands of pounds of refractory brick and lids, all of which accounts for mass that ultimately rests on a final base layer of insulating fire brick (IFB; not shown in FIGS. 1A and 1B). Conventional tunnel cross-sections with bricks that are 6 in wide, tunnel walls that are 96 in tall, and a solid lid that is 9 in thick results in a load on the supporting IFB layer of 11.6 psi. Published data using ASTM testing shows that at the temperatures present in the reformer furnaces, the base IFB layer will deform a full 1% under those loads in 100 hours. The deformation of the base IFB layer translates in one of two ways: either the deformation will prematurely compress the fiber allowances for thermal expansion, or the deformation will reduce the overall insulating value of the base IFB. Both instances are known to result in failure.

The effects of temperature and tunnel mass are not limited to the internals of the furnace, but can also cause deformation of the supporting furnace structure, leading to a non-uniform furnace floor. Conventional tunnel designs utilize mortared joints to secure the bricks to one another, effectively turning the large number of small bricks into a small number of large wall sections. These wall sections act as a single body, and cannot accommodate any major dimensional change in the furnace floor. Deformation of the supporting furnace structure will therefore result in the failure of a conventional tunnel.

Differential thermal expansion occurs not only in situations with different design materials, but also across large sections of materials that are expected to act as a single body. Conventional tunnel design also uses fiber expansion joints roughly every 6-10 feet of wall length, with all of the building components in between adhered to one another with a refractory mortar. This refractory mortar also causes the wall sections to behave as a single body. No furnace has a completely uniform temperature distribution, however, and at some point, differential thermal expansion will occur across a wall section. The stresses imparted on the wall section are the same as those that cause thermal shock within a singularly body.

FEA has been performed to determine stress levels associated with a differential temperature from the top of a fully mortared 10 ft wall section to the bottom, where the fully mortared wall section was treated as a single body for the purposes of the analysis. The bottom of the wall section was 1925° F. and the top of the wall section was 1900° F., with a uniform temperature distribution in between. The FEA also included a simulated weight of the tunnel lids and gravity, but no other external forces. It was shown that the stress of the system exceeds the 500 psi HMOR of a standard refractory mortar. Since the mortar joints are the weakest point on the wall, they crack to alleviate the stress. The more cracking that occurs in the mortared wall, the smaller the wall sections become, and the lower the stresses become in any one section.

Properly accommodating for thermal expansion is one of the most difficult aspects of any thermal application design. Conventional tunnel designs use a different materials and designs for the tunnel lid and the tunnel base. Many tunnels have low density refractory or fiber insulation in the "base" area in between the wall supporting IFB columns. The tunnel lid can expand as much as ⅜ in, thereby pushing the tunnel walls apart, whereas the fiber insulation will not impart any expansion forces on the tunnel walls. The resulting trapezoidal shape is susceptible to buckling and collapsing. In certain situations, tunnels have been found at the conclusion of a furnace campaign to have alternative movement in the lateral direction. This is more commonly known as "snaking," and is the result of the overall tunnel attempting to expand greater than the built-in allowance. This movement will crack the mortar, separate the walls from lids, and push the walls off of the IFB base; all of which lead to failure. While traditional tongue and groove brick design with a circular cross section (see, e.g., FIGS. 4 and 5) is somewhat effective in preventing lateral movement, this arrangement does will not sufficiently arrest buckling, as the rotation of one block relative to the block below it will separate the tongue from the groove, allowing a full system collapse (see, e.g., FIG. 15).

In addition to the above problems with the traditional wall design and components themselves, installing a conventional tunnel system requires a number of skilled labor positions that are becoming increasingly challenging to fill, particularly for temporary needs. This often creates a situation where the proper level of skilled labor is not available, and the overall quality of resultant installed tunnel system is compromised or the installation costs become higher than expected. In some instances, a conventional tunnel system has simply operated for the full amount of its originally projected life span, but due to short time frame of a turnaround schedule the tunnel cannot be fully repaired or replaced and must continue to perform for an extended campaign. The length of time and the high skill level required to install a conventional tunnel system therefore becomes a cause for the reliability issues. The full extent of damage that may be imparted to a tunnel system is often unknown prior to a turnaround, so a maintenance engineering crew has only a few weeks to examine, design, and implement repairs that are meant only to keep the tunnel system operational until the next turnaround, where this kind of repair can be attempted again. This is can be a very dangerous gamble for a plant, based on the long lead time and installation time associated with replacing the tunnels when a failure results in an unplanned outage.

The extended time frame and high level of skill required for installation and repairs imparts undesirable variability in quality output for conventional tunnel systems. Repairs that end up taking longer than the available window of plant turnaround time are not a viable option, and often result in an undesirably extended tunnel campaign. There is a strong desire to reduce the overall installation time and need for highly skilled labor in order to decrease this variability in quality. In some cases, conventional tunnel systems require overhead cranes to be installed to assist in the handling of the heavy tunnel lids.

In addition, in some cases, the end user may seek to add supplemental members to reinforce the tunnel wall structure and/or control the gas flow dynamics within the tunnel chamber in order to achieve improved efficiency, higher throughput or other specific results.

In order to control the gas flow, in the past, the tunnel design has been modified to exclude a brick or a half-brick from the array to provide the openings in the specific locations needed to achieve the objective, as discussed above. This conventional system, however, has much room for improvement. U.S. Pat. No. 8,439,102 discloses vector tiles that are used in conjunction with diffusor walls in reaction furnaces to control the gas flow direction, however, these vector tiles are not used in the sidewalls of hydrogen gas reformer flue gas tunnels, and since these vector tiles are cemented in place, they are not easy to install or fix in situ as the situation may demand.

To date, the prior art does not include any universally applicable refractory insert members that can be easily installed in the openings in the blocks in any location(s) desired by the end user to reinforce/strengthen the structural integrity of the tunnel and/or control the flow dynamics in any manner that is required for any particular type of application.

SUMMARY OF THE INVENTION

The object of the present invention is to provide refractory insert members for use in a light-weight, free-standing tunnel structure, preferably constructed without the use of mortar, that better withstands the application of hydrogen reformers, using more mechanically robust refractory components that are made of higher performance material. More specifically, it is an object to the present invention to overcome the drawbacks of the prior art by providing one or more refractory insert members that are installed in openings of the blocks to provide refractory block assemblies that offer improved structural stability and/or control the gas flow conditions in such a tunnel system. Preferably, the refractory insert members are used in conjunction with light-weight, structurally stable parts in system designs which avoid putting individual components into tension, and which include a network of evenly distributed, highly engineered expansion gaps that ensure the correct amount of room for thermal growth, but which do not require any precision measurement at installation.

According to one aspect of the present invention, a refractory block assembly is provided, comprising a refractory block having at least one opening formed therein, and at least one refractory insert member that resides within the at least one opening in the refractory block. The refractory insert member comprises mechanical mating member that engages a corresponding mechanical mating member provided on an inner surface of the at least one opening in the refractory block. The mechanical mating member of the refractory insert member preferably comprises a slot and groove (channel) that mechanically engage and retain a corresponding tab provided on the inner surface of the at least one opening of the refractory block. The at least one refractory insert member can be at least one (one or more) of a gas flow changing plug, a gas flow restricting puck, a gas flow changing cap, and a tie bar cradle, for example.

According to another aspect of the present invention, a refractory block assembly for a steam reformer furnace tunnel is provided. The refractory block assembly comprises a hollow main body portion having an outer peripheral surface defining a first end, an opposed second end, an upper surface, an opposed lower surface, a first side and an opposed second side, at least one through-hole having openings formed in the first side and the opposed second side of the main body portion, and a refractory insert member that resides within at least one of the at least one though-hole, the refractory insert member comprising a mechanical mating member that engages a corresponding mechanical mating member provided on an inner surface of the at least one through-hole. The hollow main body includes at least one first mechanical mating portion defining a protruded portion extending from a portion of the upper surface of the main body portion, and at least one second corresponding mechanical mating portion defining an opening corresponding to the protruded portion formed in a portion of the lower surface the main body portion. Preferably, the mechanical mating member of the refractory insert member comprises a slot and groove that mechanically engage and retain a corresponding tab provided on the inner surface of the at least one through-hole.

According to another aspect of the present invention, a refractory insert member is provided, comprising a main body part having a first end, an opposed second end, and an outer peripheral surface, and a mechanical mating member provided on at least a portion of the outer peripheral surface. According to one aspect, the mechanical mating member comprises at least one slot. According to another aspect, the mechanical mating member comprises at least two diametrically opposed slots. According to another aspect, the mechanical mating member comprises at least one flange having at least one slot and a channel (groove), open to the slot, extending around at least a portion of the outer peripheral surface of the main body. Preferably, the mechanical mating member comprises at least one flange having two diametrically opposed slots and a groove (channel), open to the slots, and extending around at least a portion of the outer peripheral surface of the main body between the slots. According to another aspect, the mechanical mating member comprises two parallel flanges, separated from one another by the channel located between the flanges, and at least one of the flanges has two diametrically opposed slots open to the channel, wherein the channel extends around at least a portion of the outer peripheral surface of the main body between the slots. The refractory insert member can be one of a gas flow changing plug, a gas flow restricting puck, a gas flow changing cap, and a tie bar cradle, for example.

According to another aspect of the present invention, a refractory tunnel assembly for a steam reformer furnace is provided. The tunnel assembly comprises a plurality of hollow base components, each the base component comprising a plurality of corresponding mechanical mating members, and a plurality of hollow wall blocks, each the wall block comprising a plurality of corresponding mechanical mating members that further correspond to the mechanical mating members of the base components, wherein at least a portion of the plurality of wall blocks further comprise at least one through-hole having openings formed in opposed side surfaces thereof. The tunnel assembly further includes a plurality of hollow lid components, each the lid component comprising a plurality of mechanical mating members that further correspond to the mechanical mating members of the base components and the wall blocks, and one or more refractory insert members that reside within one or more of the though-holes in the wall blocks. The base components are arranged to extend in a horizontal arrangement direction defining a width of the tunnel assembly and a longitudinal arrangement direction defining a length of the tunnel assembly. The wall blocks are stacked upon and mechanically interconnected to the base components via the corresponding mechanical mating members, without the use of mortar, in a vertical arrangement direction and along the longitudinal arrangement direction, and are stacked upon one and mechanically interconnected to another via the corresponding mechanical mating members, without the use of mortar, in both the vertical and longitudinal arrangement directions, to define two parallel tunnel walls, spaced a distance apart from one another in the horizontal arrangement direction, wherein the tunnel walls extend upwardly from the base components in the vertical arrangement direction and along the length of the tunnel assembly on the base components. The plurality of lid components are stacked upon and mechanically interconnected to the wall blocks via the mechanical mating members, preferably without the use of mortar, in the vertical arrangement direction and along the longitudinal arrangement direction, so that the lids extend along the longitudinal arrangement direction and the horizontal arrangement direction in order to cover the distance between the tunnel walls along at least a portion of the length of the tunnel assembly.

Preferably, the base components, the wall blocks, the lid components, and the refractory insert members all comprise the same material. According to one aspect, the tunnel assembly further comprises at least one tie bar extending between the tunnel walls in the horizontal extension direction and having a first end located in a portion of a first refractory insert member and a second end located in a portion of an opposed second refractory insert member. The at least one refractory insert member preferably comprises a mechanical mating member that engages a corresponding mechanical mating member provided on an inner surface of the at least one through-hole of the wall blocks. According to one aspect, the mechanical mating member of the refractory insert member comprises a slot and groove (channel) that mechanically engage a corresponding tab provided on the inner surface of the at least one through-hole of the wall blocks.

Thermal stresses associated with a temperature differential across a body can result in failure from thermal shock. There are a number of approaches that are utilized to reduce the thermal stresses below the yield strength of a refractory component. Decreasing the wall thickness of the refractory component allows for the thermal conductivity of the material to equalize the wall temperature and eliminates the stresses associated with the thermal differential. The wall thickness should be as thin as possible without sacrificing the overall stability of the tunnel system. Since the tunnel system is only self-supporting, reducing the wall thickness of all of the components also decreases the overall system weight.

Providing the optimal wall thickness is achieved by the proper balance of strength and weight. Thinner walls reduce thermal stresses and system weight, but thicker walls can support more load. As described in PCT/US15/34330, the entirety of which is incorporated herein by reference, the wall thickness is preferably in a range of about 0.5 in-1.5 in, most preferably in a range of 0.625 in to 0.875 in. The desired weight for each component is specified herein, and is about 40 lbs-60 lb for the blocks, 50 lb-75 lb for the lids, and 60 lb-100 lb for the bases.

In addition to reducing the wall thickness of the individual components, the "sections" of the tunnel system are reduced so that the differential temperature seen by a single section is minimized. Ideally the "sections" of the tunnel system should only be as large as the individual building components. In order to accomplished this, every block must manage its own thermal expansion, and the entire system must be mortar-free, but for stability maintenance, must be completely interconnected. This is accomplished by providing precision formed, robustly mechanically inter-connectable refractory components, and an installation procedure that automatically accommodates for the variability in each component.

In order to ensure proper thermal expansion management, the tunnel system also utilizes a base component that is made of the same material and has substantially similar dimensions with respect to the lid (cover) component. This ensures that the tunnel expands and contracts equally on both the top and bottom of the wall, maintaining the overall structure and reducing stresses that could otherwise cause buckling. Buckling can also be arrested by virtue of the robust and tight tolerance interlocking mechanical mating feature provided in the wall components, so that the rotation of a block in relative to a block below it does not break direct contact.

Even if the thermal expansion is properly managed, in order to further prevent buckling from still being an issue as a result of delayed ignition or a non-uniform furnace floor, cross-beam supports or tie bar (tie rod) supports are also provided at predetermined locations in connection with an associated refractory insert member (i.e., a tie bar cradle insert member).

Other refractory insert members, such flow restricting/constricting plugs and flow directing caps, can also be installed in various locations throughout the tunnel array to control the flow dynamics in any intended manner. Any of the various refractory inserts according to the present invention can be used in conjunction with any opening/hole location in any of the bricks of the tunnel system. This provides a modular system and allows for a universal refractory insert-mating tab to be provided on the surface of the openings (through-holes) of blocks (bricks) that can be used in conjunction with any type of refractory insert member in any location in the tunnel. Such flexibility allows the end user to modify the installation of refractory insert members in any manner that they deem necessary, depending on the particular processing concerns that they may face.

While the refractory insert members according to the present invention are preferably used in conjunction with the reduced-weight refractory blocks also described herein, it should be noted that the refractory insert members according to the present invention can likewise be readily inserted in conjunction with standard bricks and standard brick tunnels. In that case, for example, a standard brick or a pre-cast brick sized piece can be modified to include a through-hole having a mechanical mating feature (e.g., a tab) that is either pre-formed on (i.e., machined or cast) or later added onto (adhered) the inner surface thereof to engage the refractory insert member in the same manner described herein.

Proper material selection and installation procedures are also important to prevent "snaking." Many materials will increase in overall dimension when re-heated, increasing variability and adding challenge to the thermal expansion management. Because the coefficient of thermal expansion for refractory components is nonlinear, it must be fully characterized and understood to ensure that proper expansion joints are created. Selecting a suitable material has always been about compromise and sacrifice in connection with conventional tunnel designs. That is, conventionally, bricks that have sufficient insulating value to keep the furnace supports from deforming do not always also have enough strength to adequately support the tunnel system, and bricks with higher strengths do not have the required insulating value. Conventional materials include various types of fire bricks and super duty brick.

The coefficient of thermal expansion (CTE) for the selected material should not simply be assumed as a linear function for the materials used in the tunnel system. Having a fully characterized CTE is preferable for ensuring that the expansion behavior is properly managed. This becomes even more critical when the thermal expansion is managed on a single component level. Proper material selection preferably includes confirming that the modulus of rupture at the service and excursion temperatures of the furnace has a sufficient safety factor when compared to the associated static load stresses. Selecting a material with an improved HMOR provides immediate increases to the safety factor in the system. Knowing the room temperature MOR of a refractory material alone is not sufficient for proper design of a tunnel system.

In addition, any material being selected for use in a reformer furnace should preferably have the highest resistance to creep reasonably available, as a reduced creep will prolong the life of the tunnel system and prevent premature failures. The use of a material with improved creep resistance reduces the tension on the bottom side of the top lids, and reduces the outward force that the top lids exert onto the brick walls of the tunnel, which is preferred. Using a material having a fully characterized CTE, higher HMOR, and increased creep resistance together improves the overall reliability of the tunnel system.

In view of the above, in the present invention, suitable materials for the bricks (blocks), bases, the covers (lids) and the refractory insert members include, but are not limited to alumina-based refractory materials, cordierite (magnesium aluminum silicate), and zirconia, for example. More preferably, the blocks, lids and bases are made from a material selected from the group consisting of medium duty fire clay brick (Oxide Bonded Alumina comprised of at least 30% alumina by weight), high duty fire clay brick (Oxide Bonded Alumina comprised of at least 35% alumina by weight), super duty fire clay brick (Oxide Bonded Alumina comprised of at least 40% alumina by weight), and high alumina fire clay brick (Oxide Bonded Alumina comprised of at least 60% alumina by weight). Most preferably, the present invention utilizes Mullite Bonded Alumina comprised of 88% alumina by weight or an Oxide Bonded Alumina comprised of 95% alumina by weight.

The tunnel also utilizes a base component that distributes the weight load of the wall over an area that is roughly 5 times larger than the conventional design. The light-weight design of the present invention, coupled with the inventive base component, typically results in a load on the base layer of 1.4 psi. This allows for the use of highly insulating materials, which improves the overall reliability of the structural furnace supports and therefor the overall system.

As mentioned before, a conventional tunnel cross-section, with bricks that are 6 in in width, tunnel walls that are 96 in tall, and a solid lid that is 9 in thick, results in a load on the supporting IFB layer of 11.6 psi and a deformation of 1% within the first 100 hours of the campaign. Decreasing the overall weight of the entire tunnel system by 60% translates into a significantly lower PSI load, and results in an order of magnitude less deformation to the base layer, thus increasing the effective production life and efficiency of the tunnel.

With reduced wall thickness and improved materials, the light-weight tunnel lids can be easily installed or removed by two laborers. In addition, the light-weight, mortar-free block design with interlocking components is easily handled by one laborer, and the tunnel structure can assembled, repaired and/or disassembled as necessary without significant consequence or the requirement for high levels of skill. The refractory insert members according to the present invention can encompass any desired type of component, including but not limited to flow constricting/restricting plugs, flow directing cups and cradles for cross beam supports (i.e., tie bars), and can be easily added to the blocks (to define a block assembly) or removed from the blocks without limiting access to other tunnel components during turnarounds, ensuring that repairs can be complete and effective. Faster installation and repair time also allows for proper repairs to be made more readily, improving the overall reliability of the system.

Reducing the weight of the components, while maintaining the structural integrity of the building blocks, makes it possible to eliminate much of the crushing force on the lower courses of the brick. Providing light-weight, structurally correct cover (lid) segments overcomes the drawbacks previously associated with making those components thicker in order to be stronger, which also detrimentally added additional load to the entire system. The incorporation of expansion gaps between each brick and elimination of mortar from the system ensures that the assembly can expand and contract without the creation of large cumulative stress, and reduces the installation time of the tunnel as a whole. Providing universal, modular refractory insert members and block assemblies in connection with any type of block further enables end users to modify the system and custom tailor the flow dynamics according to their particular needs.

BRIEF DESCRIPTION OF THE DRAWINGS

For a better understanding of the nature and object of the present invention, reference should be made to the following detailed description of a preferred mode of practicing the invention, read in connection with the accompanying drawings, in which:

FIG. 19C is a perspective view of the assembly including the installed tie bar cradle insert member 15.

DETAILED DESCRIPTION OF THE INVENTION

Blocks (Also Referred to Herein Interchangeably as Bricks)

The flue gas tunnel according to the present invention comprises a plurality of refractory blocks or bricks, which are used in conjunction with one or more refractory insert members to define a refractory block assembly. While standard bricks or pre-cast brick shaped members can be used, as noted above, the refractory blocks are preferably engineered with precision interlocking mechanical mating features to facilitate stacking interconnection to form the free-standing tunnel walls without the use of mortar. These mechanical mating features are also specifically designed to allow for thermal expansion in service while simultaneously preventing the wall from becoming disassembled prematurely.

Figure 10:
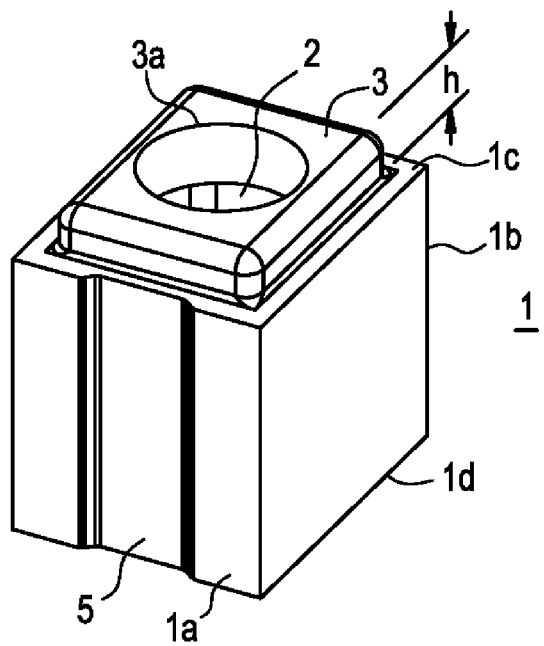
FIG. 10 is a perspective top view of a half block (brick) according to one aspect of the present invention.
Figure 11:
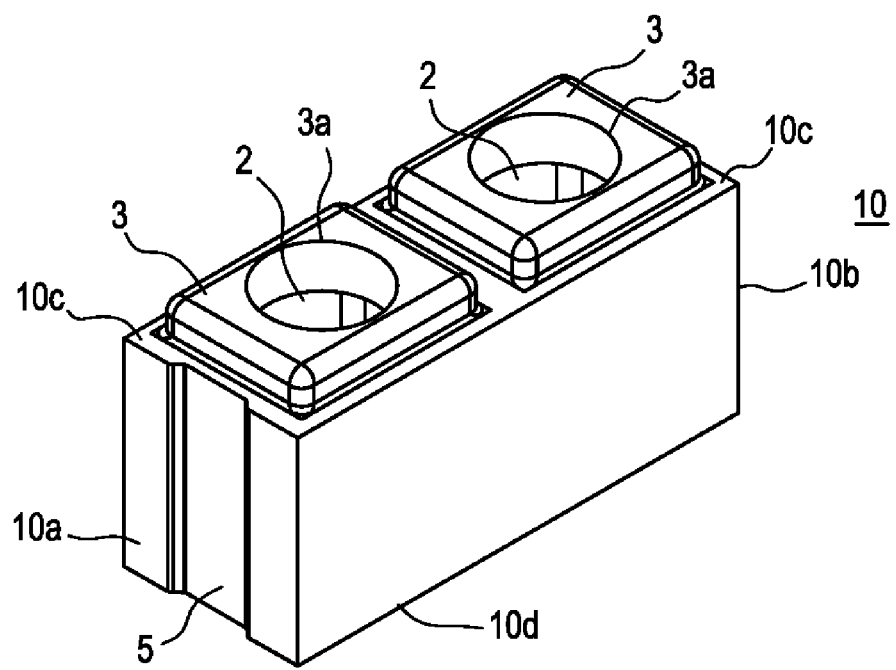
FIG. 11 is a perspective top view of a full block (brick) according to one aspect of the present invention.
Figure 12:
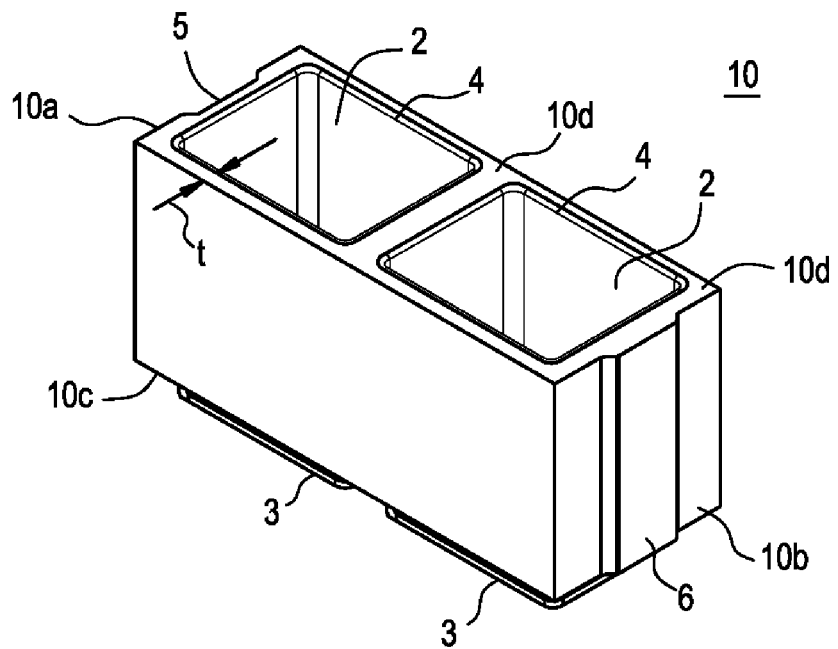
FIG. 12 is a perspective bottom view of the full block shown in FIG. 11.

One example of a mating feature has a geometry that requires horizontal installation and prevents the block from becoming disassembled vertically. FIG. 10 shows a "half brick" 1 and FIG. 11 shows a "full brick" 10. FIG. 12 is a bottom view of the full brick 10 shown in FIG. 11. It should be understood that the corresponding bottom view of the half brick 1 shown in FIG. 10 (not shown) would be same as that shown in FIG. 12, only half the size. A standard brick has dimensions of, for example, 6.5 in W×18 in L×10 in T (tall), but the design is applicable for bricks as small as 2 in W×4 in L×2 in T and for bricks as large as 9 in W×24 in L×18 in T, as well. Preferably, each block (brick) has a weight in a range of 20-70 lb, more preferably 40-50 lb, so that one person can readily maneuver the blocks alone, while reducing the total number of blocks needed to construct the tunnel wall to the smallest number possible.

Figure 1A:
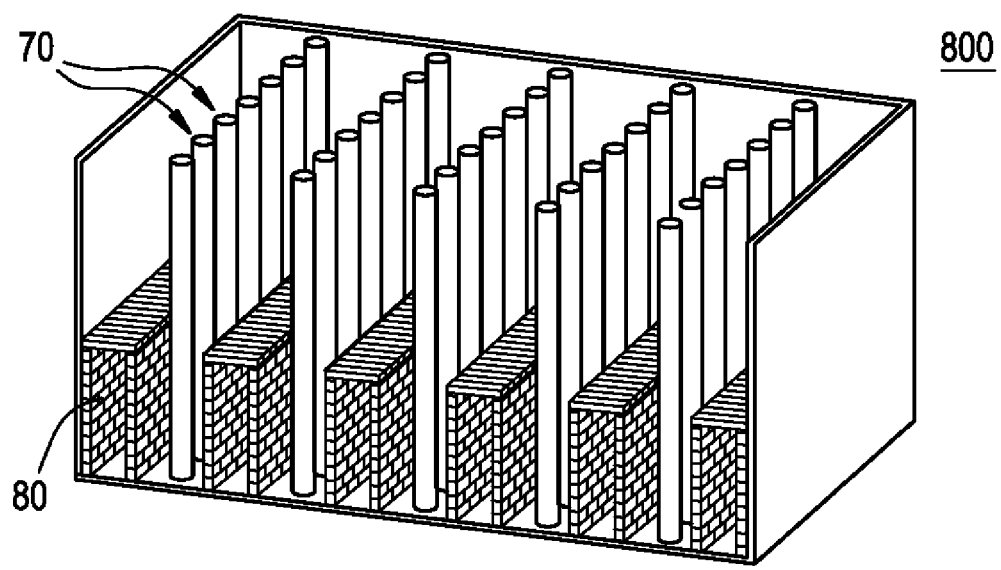
FIG. 1A is a perspective cut-view of a conventional hydrogen reformer furnace.
Figure 1B:
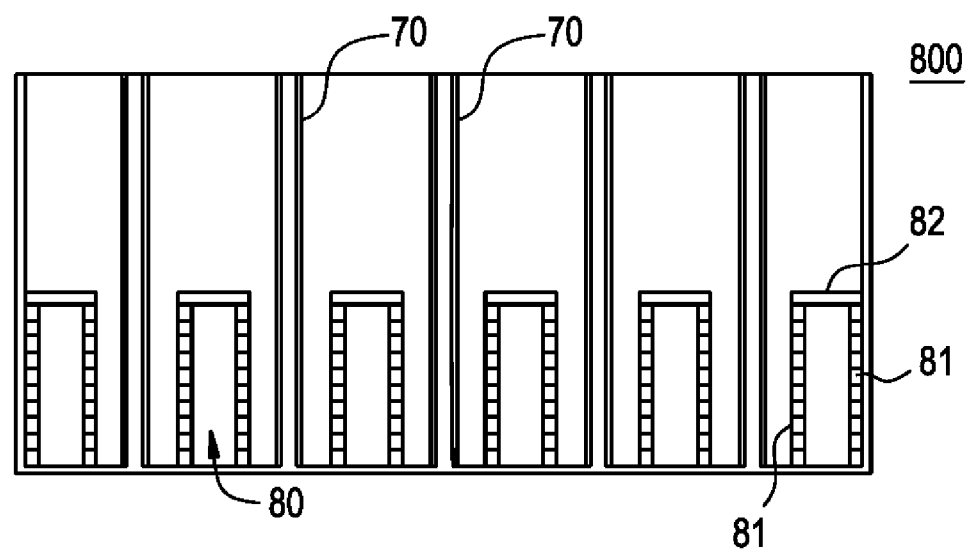
FIG. 1B is a sectional end view of the furnace shown in FIG. 1A.
Figure 2:
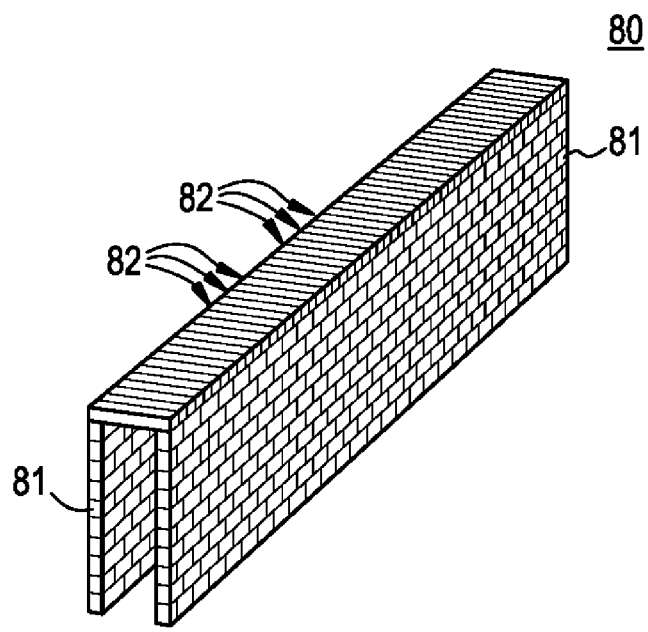
FIG. 2 is a perspective view of a conventional tunnel assembly used in the furnace shown in FIGS. 1A and 1B.
Figure 3:
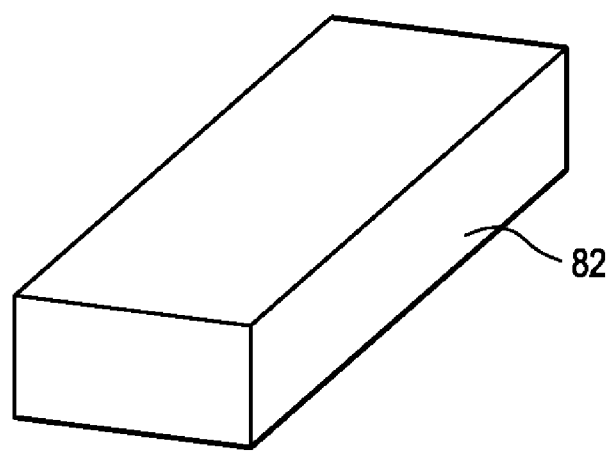
FIG. 3 is a perspective view of a conventional solid lid.

It should be noted that although the blocks 1, 10 as shown do not include any through-holes, either type of block 1, 10 can be modified or manufactured to include one or more though-holes, as discussed below in connection with FIGS. 16A-1C. An example of a half-block 1A including at least one though-hole (and having a refractory insert member installed therein) is shown and described below in conjunction with the refractory block assemblies and tunnel assembly structure of FIGS. 25-29.

Each of the bricks 1, 10 has an outer peripheral surface defining a first end (1a, 10a), an opposed second end (1b, 10b), an upper surface (1c, 10c) and an opposed lower (bottom) surface (1d, 10d). These bricks 1, 10 are hollowed out to remove all possible material from non-critical areas. Preferably, the wall thickness "t" (see, e.g., FIG. 12) walls of these bricks 1, 10 is in a range of 0.5-1.5 in, preferably 0.625-0.875 in. The resultant tunnel assembly has only about 60% of the weight of a conventional tunnel. The hollowed-out portions define one or more, preferably a plurality of cavities 2 in the respective blocks 1, 10.

The upper surfaces 1c, 10c of the blocks 1, 10 each include a male part of the precision interlocking mechanical mating features of the refractory blocks according to the present invention. The protruding portion 3 is elevated a distance from the surface 1c, 10c to define a geometrical member that extends from the block 1, 10 and serves as a locking part that fits precisely into the opening 4 formed in the lower surface 1d, 10d of the blocks 1, 10. As shown, the protruding portion 3 is a substantially rectangular elevation with chamfered corners and a circular opening 3a passing through its center and in communication with a cavity 2. The circular opening 3a is merely a function of manufacturing and material removal considerations, and is not critical. As shown in FIGS. 10 and 11, the openings 3a are in communication with the cavities 2. This is not always the case, however, as described in more detail below.

While the exact shape of the protruding portion 3 is not necessarily limited to the shape shown here, it is preferably a geometric match to the shape of the corresponding opening 4, with a slight off-set to accommodate manufacturing tolerances. The protruding portions 3 of the blocks 1, 10 must fit precisely within the openings 4 of the vertically adjacent blocks 1, 10 to securely engage the vertically adjacent blocks 1, 10 to one another to facilitate the construction of free-standing tunnel walls without the use of mortar. There must also be sufficient tolerance to account for the thermal expansion considerations discussed above, and to maintain contact to prevent buckling.

Figure 13:
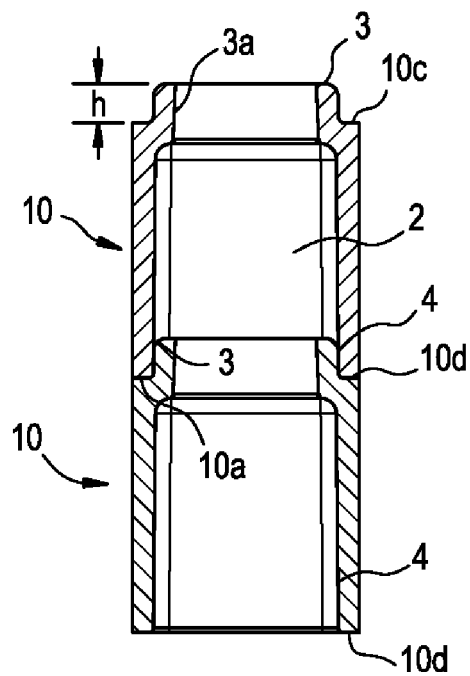
FIG. 13 is a sectional end view of two blocks shown in FIG. 11 in a stacked arrangement.

The opening 4 communicates with the cavities 2 of the blocks 1, 10, and receives the protruding portion 3 in a tight, interlocking manner to securely connect the blocks 1, 10 to one another, without mortar, in a vertically stacked manner, as shown in FIG. 13. The shape of the opening 4 is not critical, so long as it precisely corresponds in shape and size to the shape and size of the protruding portions 3, in consideration of the mechanical factors and thermal concerns discussed above.

The importance is the geometric match with a slight off-set between the corresponding protruding portion 3 and opening 4 into which the protruding portion 3 fits. Preferably, the off-set is in a range of 0.020 in to 0.060 in. The minimum off-set is dictated by manufacturing tolerance capabilities resulting in block to block variability. There must be sufficient height and tightness to securely engage if buckling occurs. Preferably, the overall height "h" of the protruding portion 3, or distance that the protruding portion 3 extends from the upper surface 1c, 10c of the blocks 1, 10, is at least 0.75 in, in order to ensure sufficient engagement with the opening 4 and prevent buckling. The dimensions of the opening 4 should be as tight to the protruding portion as possible with allowance for manufacturing variation. Ideally, uniform wall thickness balanced with manufacturing needs governs the dimensions.

The individual blocks 1, 10 further include additional mechanical mating features, such as a tab on one end and a groove on the other end, with a gap provided that allows each block to expand with increasing operating temperature until its seals against the blocks on either side thereof in the horizontal arrangement direction. As shown in FIGS. 10-12, the first sides 1a, 10a of the blocks 1, 10 include a groove or slot 5, and the opposed second sides 1b, 10b are formed to include a corresponding "tab" or protrusion 6 that vertically fits into the corresponding groove 5 of a horizontally adjacent block 1, 10. Preferably, the groove is larger than the tab by a minimum of manufacturing variation; preferably, the tab is 30-75% of the overall width of the block.

A compressible high temperature insulation fiber (not shown) can also be provided, placed in the groove 5 in order to reduce gas bypass while accommodating for a range of temperature fluctuations in service. The fiber is specified to have sufficient compression variability so as to reduce gas bypass over a wide range of operating temperatures from 600° C.-1200° C. This fiber can also be used in between layers of blocks to prevent point loading. As discussed below, the base components and top lids (covers) both have a similar tab and groove design, and use either a fiber gasket or a fiber braid to reduce gas bypass over the range of operating temperatures.

Figure 4:
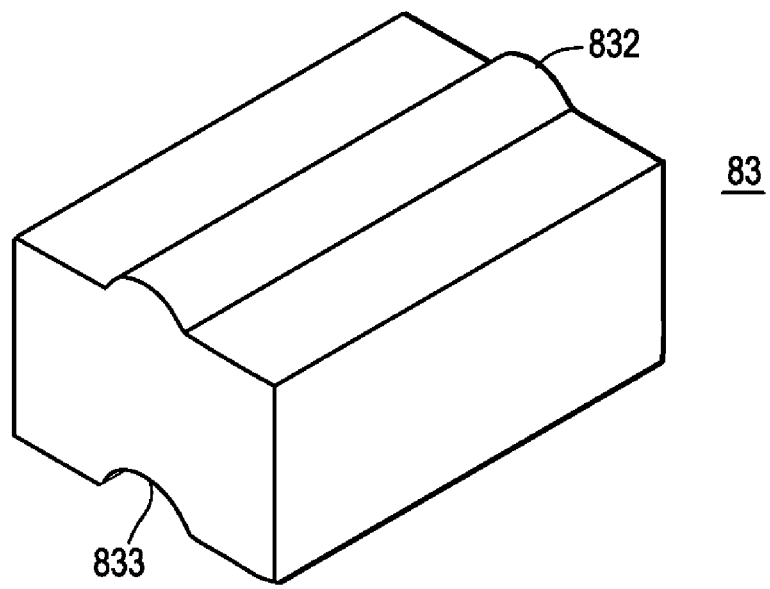
FIG. 4 is a perspective view of a conventional single tongue and grove type block (brick)
Figure 5:
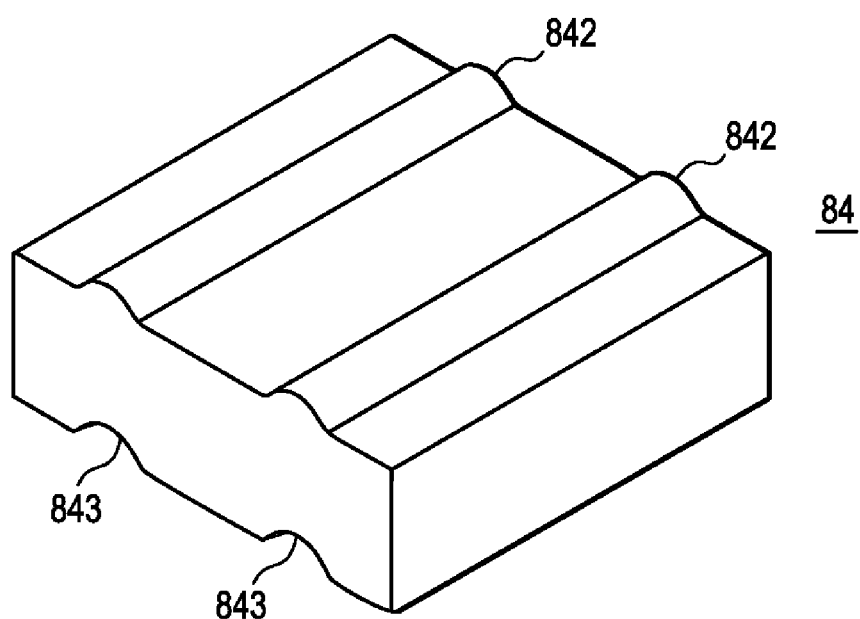
FIG. 5 is a perspective view of a conventional double tongue and grove type block (brick)
Figure 6:
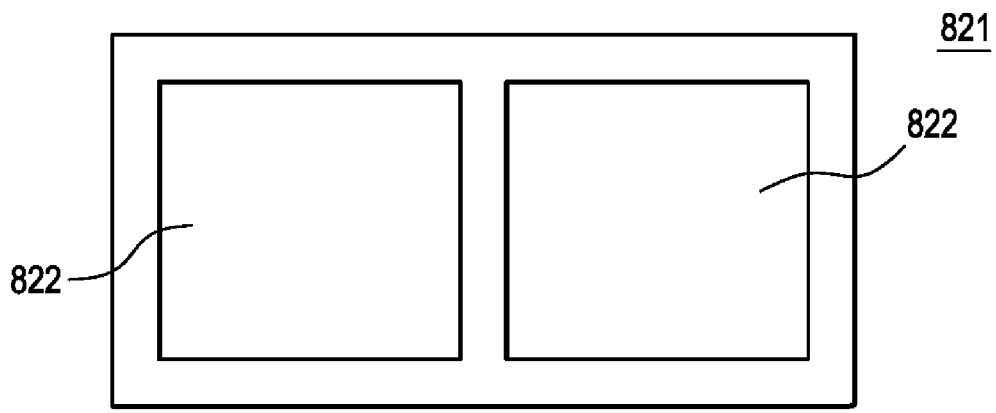
FIG. 6 is an end view of a conventional hollow lid.
Figure 7:
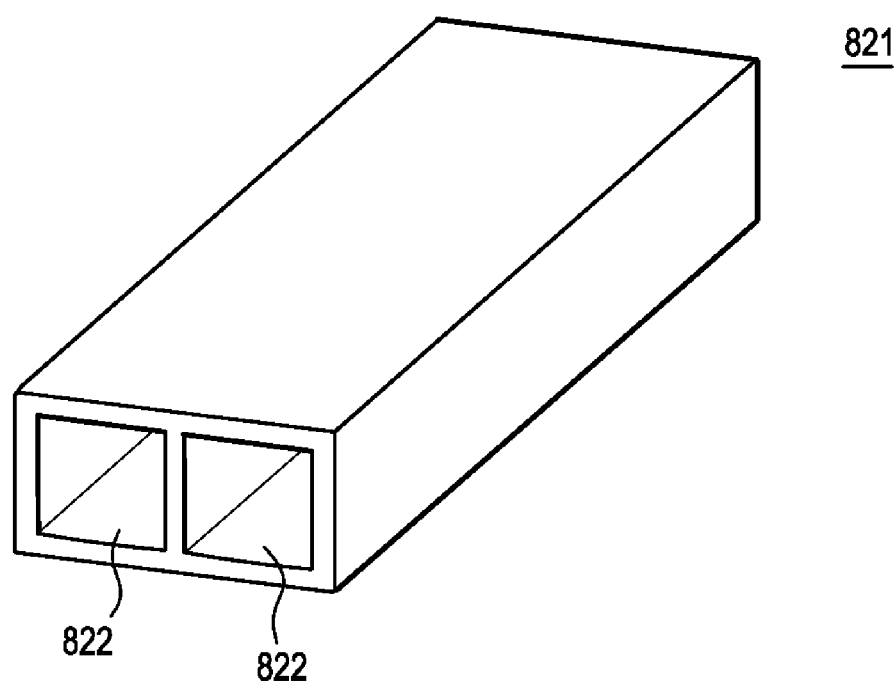
FIG. 7 is a perspective view of the conventional hollow lid shown in FIG. 6.
Figure 8:
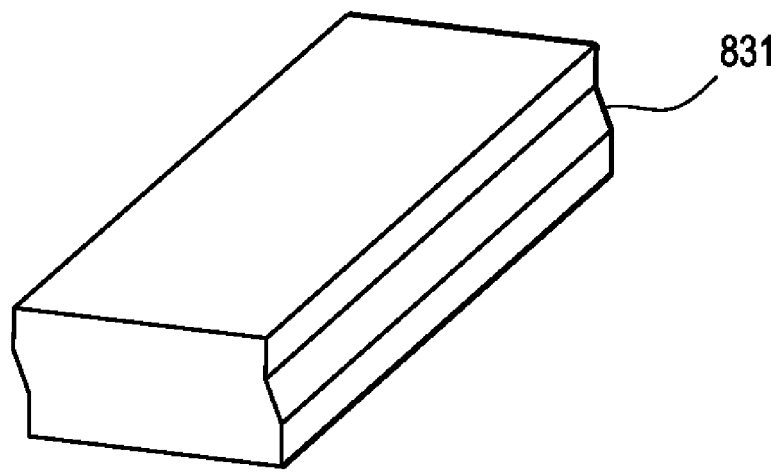
FIG. 8 is a perspective view of a conventional off-set lid.
Figure 9:
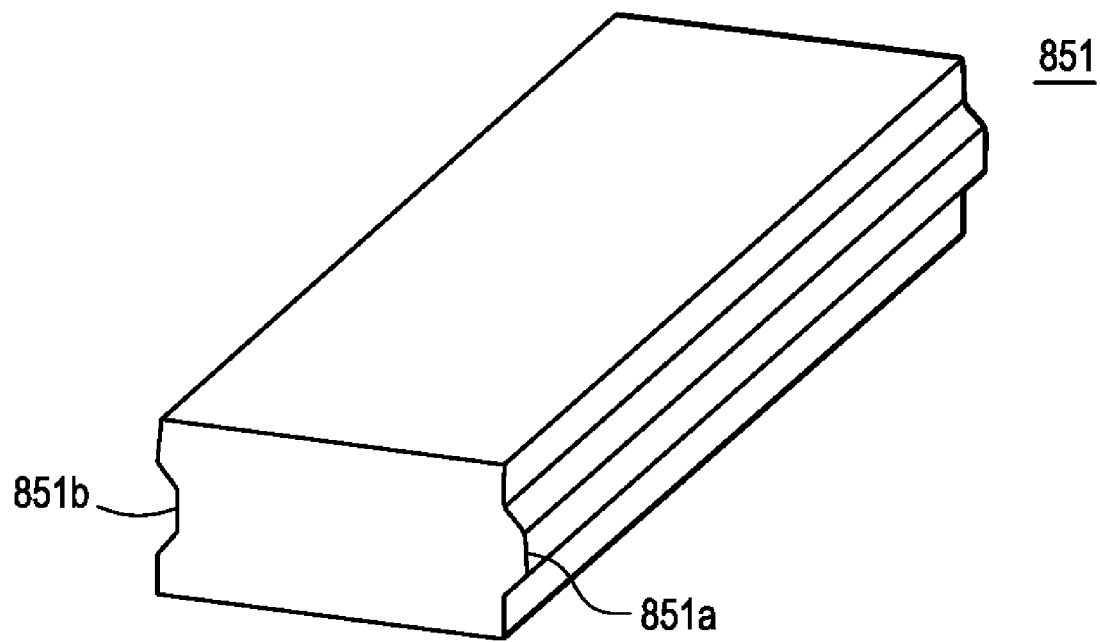
FIG. 9 is a perspective view of a conventional tongue and groove lid.
Figure 14:
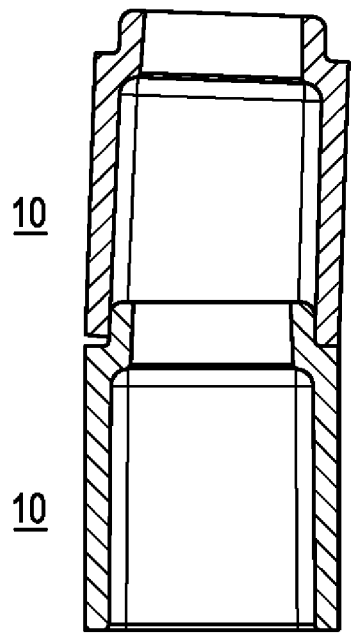
FIG. 14 is a sectional end view of the stacked arrangement shown in FIG. 13 under rotational force to illustrate that the stacked blocks to not disengage.
Figure 15:
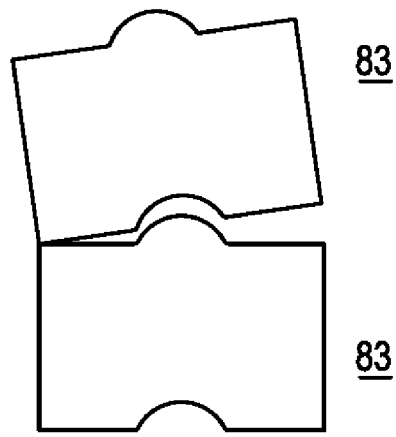
FIG. 15 is an end view of prior art blocks shown in FIG. 4 under rotational force to illustrate that those blocks do disengage under the same type of rotational force.
Figure 25:
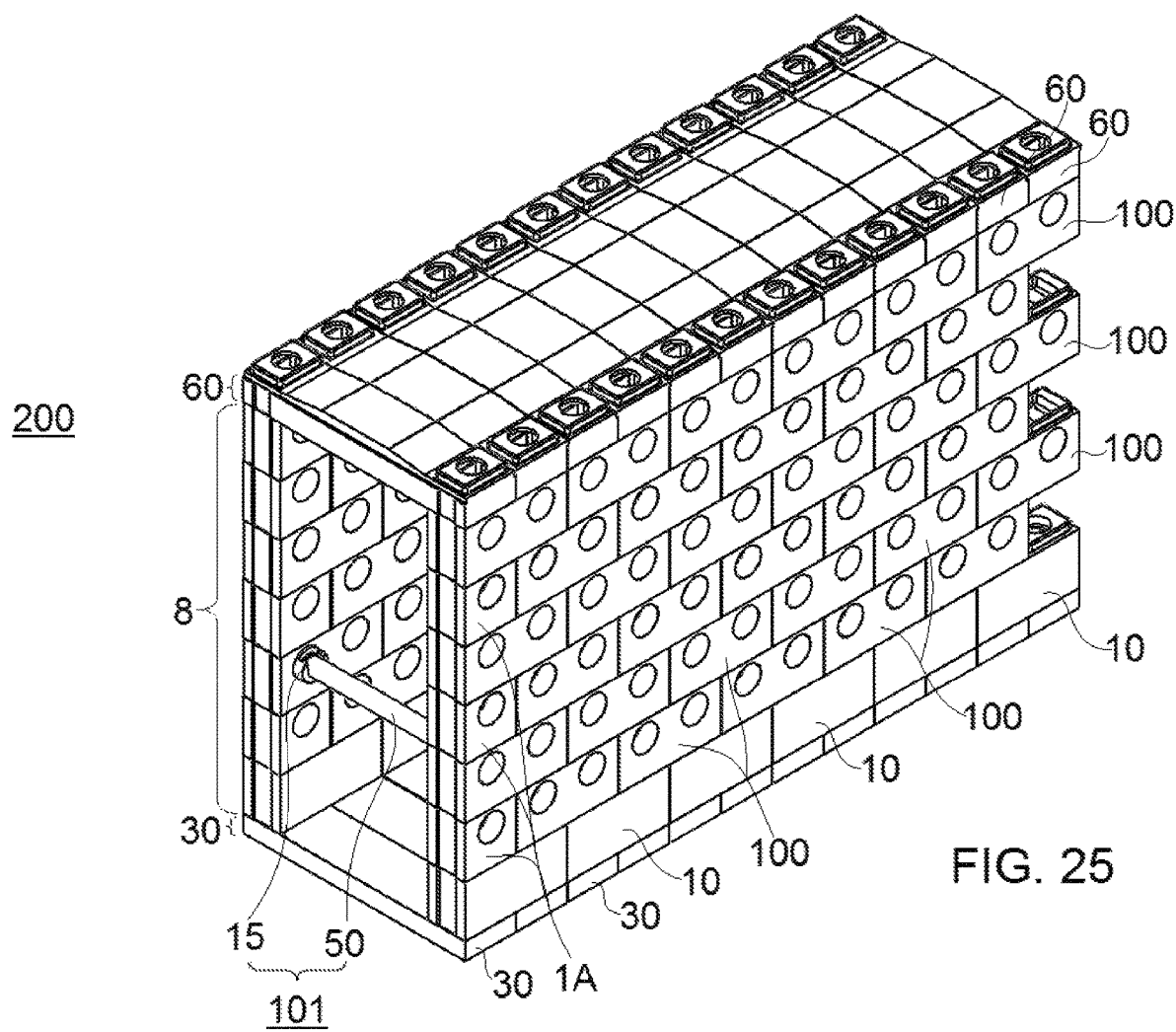
FIG. 25 is a perspective view of a tunnel assembly according to the present invention.

Preferably, as the blocks 1, 10 are arranged in the formation of the tunnel wall, the blocks 1, 10 are horizontally off-set by one-half of a block length, or by one set of mechanical mating features, to increase the mechanical robustness of the arrangement (see, e.g., FIG. 25 in connection with blocks 1A, 10 and 100). This arrangement also helps prevent buckling, which is arrested by virtue of the robust and tight tolerance interlocking mechanical mating feature, so that the rotation of one block relative to a block below it does not cause direct contact between the respective protruding portion 3 and the opening 4 to break, as shown in FIG. 14. On the other hand, FIG. 15 shows how rotational forces on prior art tongue and groove blocks (see FIG. 4) can cause separation between the blocks, and direct contact between the respective tongue and groove features significantly breaks, which leads to wall collapse.

The mechanical mating features described above add redundancy to the system by mechanically engaging the blocks, which prevents the tunnel wall from leaning and falling over without requiring that mating features be sheared off or otherwise break through the wall of the block to which they are connected.

In order for the tunnel to properly act as a flue for the exit of the furnace, it must have variable inlet conditions (openings in the walls), for example, which typically allow more gas to enter the tunnel farthest from the exit, and less gas to enter the tunnel closer to the exit (or in any manner dictated by the processing concerns). The typical arrangement creates a more uniform distribution of gas and temperature in the furnace. As noted above, conventional tunnel wall designs simply utilize half bricks to create gaps in the walls as various locations. However, such conventional half bricks create unsupported locations on top of the square openings, creating locations for failures.

Figure 16A:
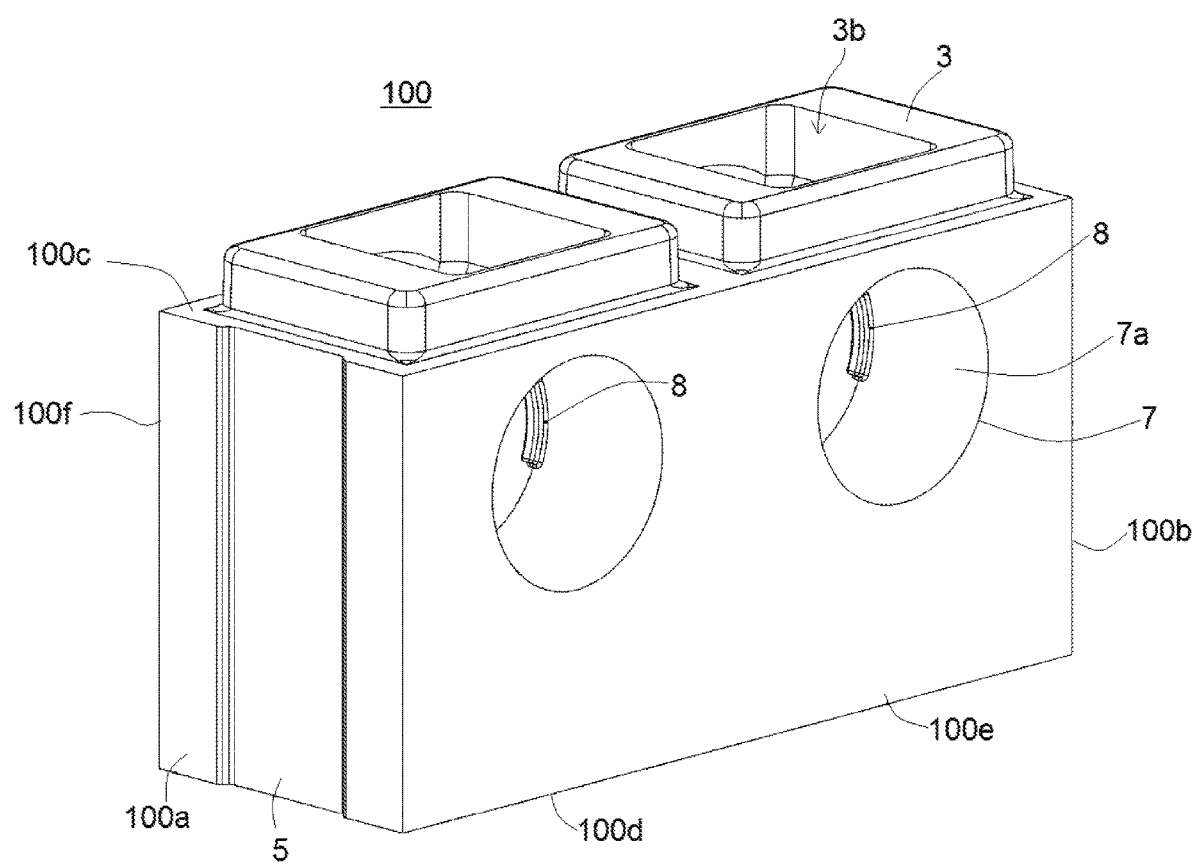
FIGS. 16A and 16B are perspective views of a full block including at least one though-hole (two as shown) according to the present invention.
Figure 16B:
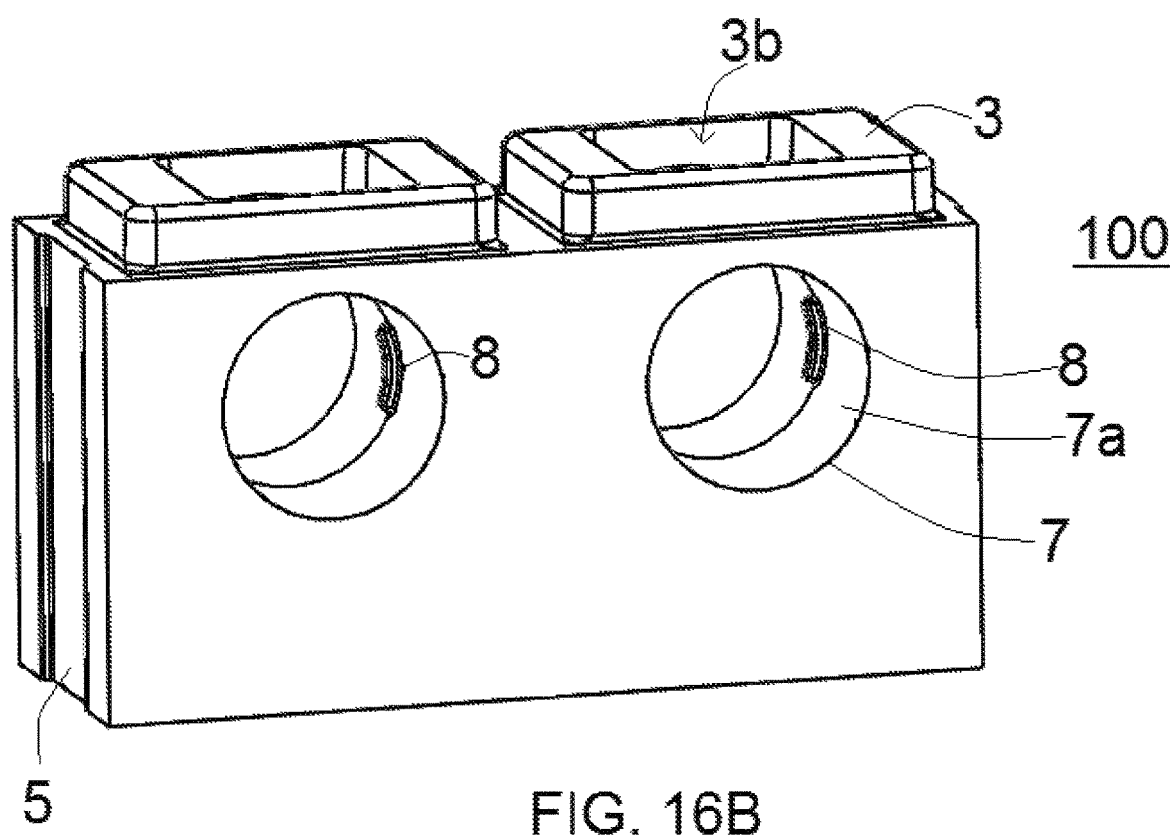
Figure 16C:
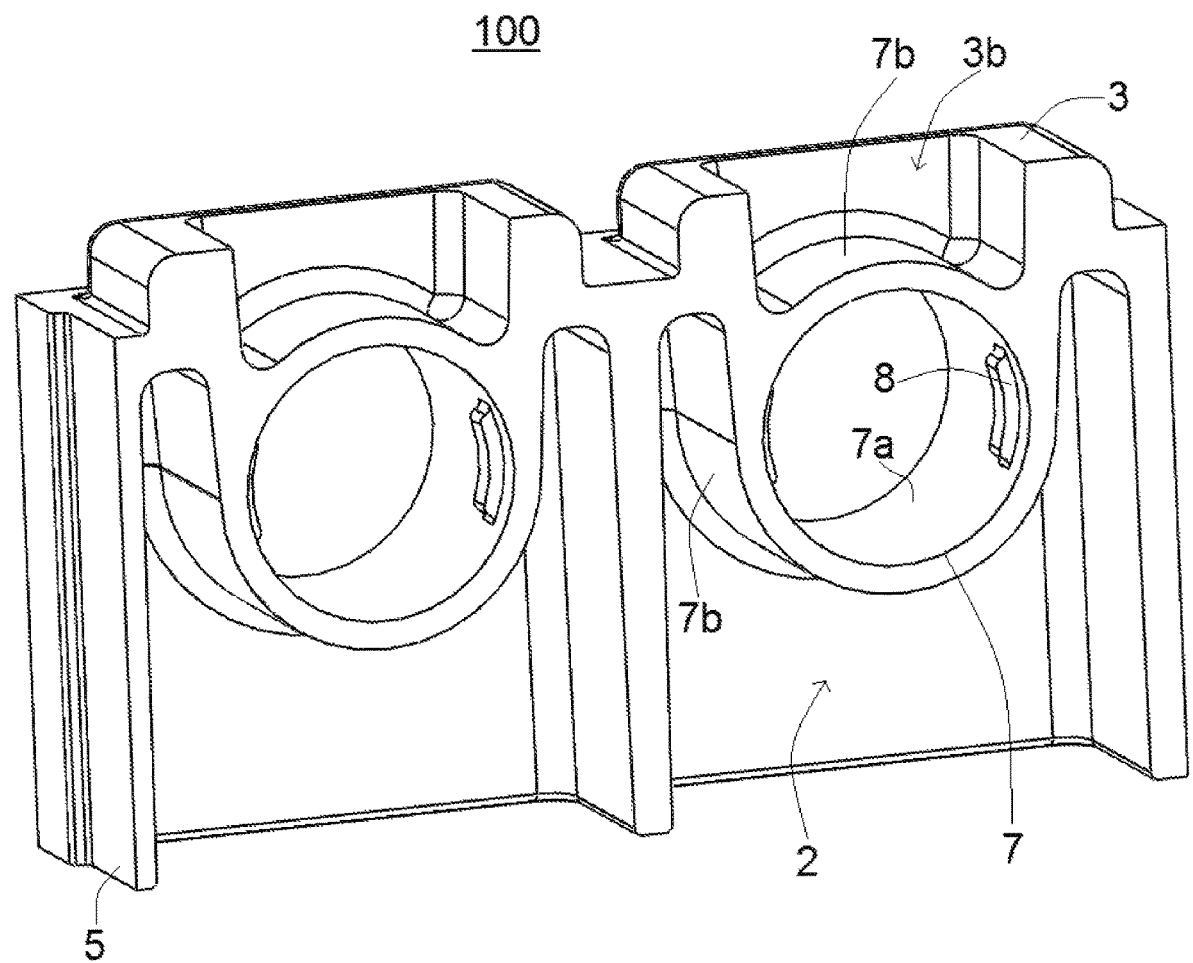
FIG. 16C is a cut-view of the full block shown in FIGS. 16A and 16B.

As shown in FIGS. 16A-C, the tunnel system (see FIGS. 25-59) utilizes refractory blocks 1A and 100 that include one or more through-holes 7 formed therein in order to allow gas to enter the tunnel. This design evenly distributes the load created by the through-holes 7 to the surrounding material. The through-holes 7 can be formed when the bricks 1A, 100 are initially formed (e.g., cast), or can be formed later by machining or any suitable process.

The block 100 has an outer peripheral surface defining a first end 100a, an opposed second end 100b, an upper surface 100c, and an opposed lower (bottom) surface 100d. Although a full block 100 is shown, it should be understood that a half-block could also be used, which would be the same as block 100, but only half the size (see, e.g., the description in connection with FIGS. 10 and 11). Like the structure shown and described in connection with shown in FIGS. 10-12, the first sides 100a of the blocks 100 include a groove or slot 5, and the opposed second sides 100b are formed to include a corresponding "tab" or protrusion 6 (not shown) that vertically fits into the corresponding groove 5 of a horizontally adjacent block 100. Preferably, the groove is larger than the tab by a minimum of manufacturing variation; preferably, the tab is 30-75% of the overall width of the block. A compressible high temperature insulation fiber (not shown) can also be provided, placed in the groove 5 in order to reduce gas bypass while accommodating for a range of temperature fluctuations in service. The fiber is specified to have sufficient compression variability so as to reduce gas bypass over a wide range of operating temperatures from 600° C.-1200° C. This fiber can also be used in between layers of blocks to prevent point loading.

Preferably, as the blocks 100 are arranged in the formation of the tunnel wall, the blocks 100 are horizontally off-set by one-half of a block length, or by one set of mechanical mating features, to increase the mechanical robustness of the arrangement (see, e.g., FIG. 25 in connection with blocks 1A and 10). This arrangement also helps prevent buckling, which is arrested by virtue of the robust and tight tolerance interlocking mechanical mating feature, so that the rotation of one block relative to a block below it does not cause direct contact between the respective protruding portion 3 and the opening 4 to break.

The through-holes 7 of the blocks 100 can have any geometry, but preferably have a circular or semi-circular shape. The size of the through-holes 7 can vary from 1 in$^2$ up to substantially to the full size of the block 100, which is typically around 144 in$^2$, but are preferably 12 in$^2$-36 in$^2$. For example, in FIGS. 16A-16C, the though-holes 7 have a diameter of approximately 4.5 inches. Blocks 100 preferably have one or two through-holes 7 per block, but could have multiple holes in various locations to facilitate the same end result, as desired. These through-holes 7 are preferably be closed, i.e., do not communicate with the interconnected internal cavities 2 of the blocks 100 that form an internal area of the tunnel wall, as shown (see FIG. 16C), or instead, a number of blocks could have through-holes that are open to the internal area of the tunnel wall.

As shown in FIGS. 16A-16C, the opening 3b in the protruding portion 3 is simply a removed-material portion, and does not communicate with (not in fluid communication with) the cavity 2. As best shown in FIGS. 16B and C, the through-hole 7 is like a tube that passes though the cavity 2, but the internal surface 7a of the through-hole 7 is not in fluid communication therewith, and the through-hole 7 (though which the gasses pass) is therefore closed to the cavities 2 (and therefore the internal surface area of the tunnel wall) by virtue of the external surface 7b of the through-hole 7.

A mechanical mating member, such as one or more tabs 8, are provided on the inner surface 7a (i.e., inner diameter; see FIGS. 16B, 16C) of the through-hole 7, to serve as a mechanical fastening feature that interlocks with corresponding mating features provided on various refractory insert members. As shown in FIGS. 16A-C, the tabs 8 are preferably located on diametrically opposed portions of the inner surface 7a of the through-hole 7. Although the exact dimensions of the tabs 8 are not expressly limited by anything except the corresponding mating geometry of the insert members (described below), these tabs 8 have a preferred dimension of ⅜" high (protruding from the inner through-hole surface 7a), ¾" long (axial distance), and 1.75" wide (radially). While the size of the tabs 8 and the shape of the tab 8 can readily be modified, it is preferred that the aspect ratio of 2:1, length: height is maintained. Preferably, the size of the tab 60° or less with respect to the circumference of the inner diameter (inner surface) 7a of the through-hole 7, but must necessarily be only slightly less than the corresponding receiving part (opening/slot) on the insert member, in order to by-pass the opening and fit therein or within the receiving groove (once rotated).

Base Component

Figure 17:
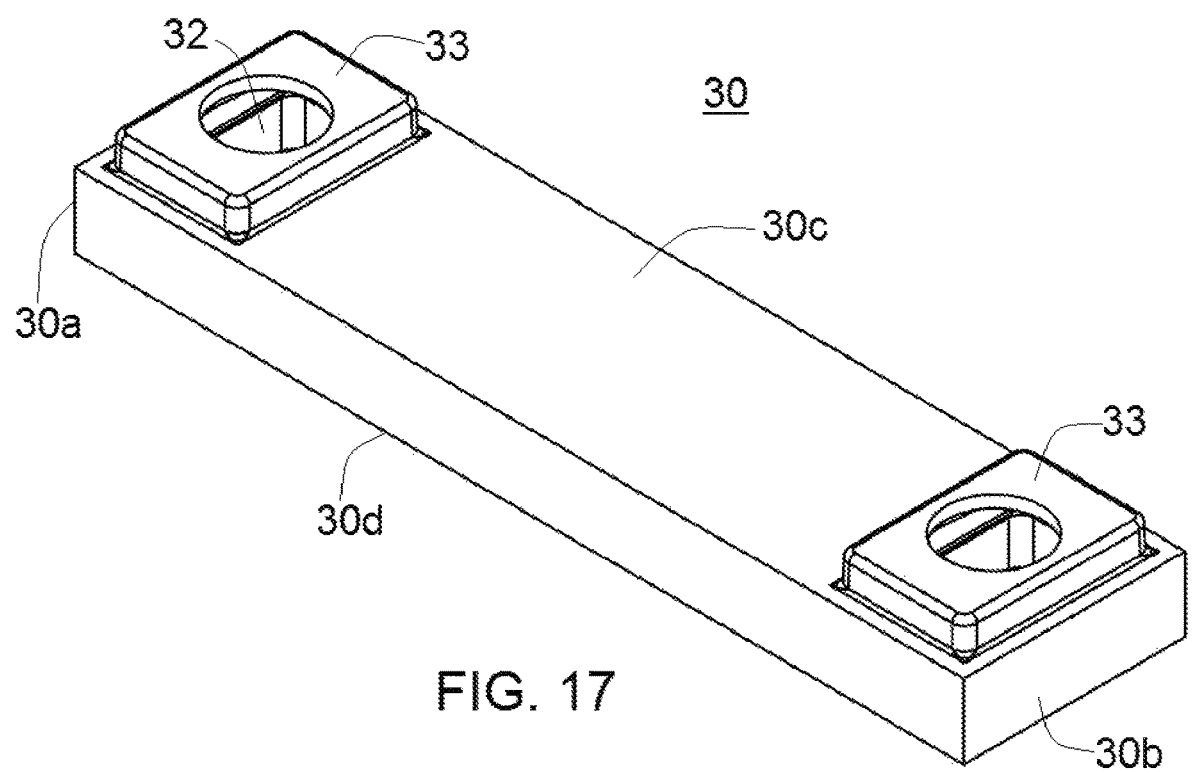
FIG. 17 is a perspective top view of a full width base component according to the present invention.

The base component 30 is shown in FIG. 17. A plurality of base components 30 run the length of the tunnel and span the horizontal width 'w' of the tunnel to connect the two walls together using the same mating features as the wall blocks 10, 100 described above (see, e.g., FIGS. 25-29).

Each base component 30 has an outer peripheral surface with an upper surface 30c and an opposed lower (bottom) surface 30d on which the interlocking mechanical mating features protruding portions 33, and corresponding openings 34 (not shown) are respectively formed. The protruding portions 33 correspond to the protruding portions 3 described above in connection with the bocks 1, 10, 100, and the openings 34 correspond to the openings 4 described above in connection with the blocks 1, 10, 100. The same critical dimensional requirements for the mechanical mating members and wall thicknesses discussed above apply to the base components, as well. Preferably, each base component 30 has a total weight in a range of about 60-100 lb, more preferably less than about 70 lbs.

The protruding portions 33 are provided on the upper surface 30a of the base components 30 proximate the two opposed ends 30a, 30b, so as to correspond to the laterally (horizontally) opposed locations of the tunnel walls to be built thereon. The openings 34 are provided in the bottom surface 30d of the base component 30 in corresponding locations. In some embodiments, the base component 30 has a plurality of cavities from which unnecessary material has been removed to reduce the weight of the base block. The openings 32 are material removed portions and may or may not communicate with such cavities, and a plurality of additional cavities are provided along the length of the base component 30, separated by interior block walls having sufficient thickness to provide enough material to ensure the structural integrity of the component is maintained. The wall thickness is preferably in a range of 0.5 to 1.5 in, preferably 0.625 to 0.875 in.

As noted above, it is important that the size and material of the base component 30 is substantially the same as that of the lid (discussed in more detail below) in order to properly and effectively compensate for thermal and stress factors, although the base is a heavier component, as one skilled in the art can appreciate.

Lids (Also Referred to Herein Interchangeably as Covers)

The span of the top lid 60 can be as small as 12 in, or as wide as 60 in, although the preferred size is a range of 24 in to 36 in. Preferably, each lid component has a total weight in a range of 50-100 lb, more preferably in a range of 60-80 lbs.

Figure 23:
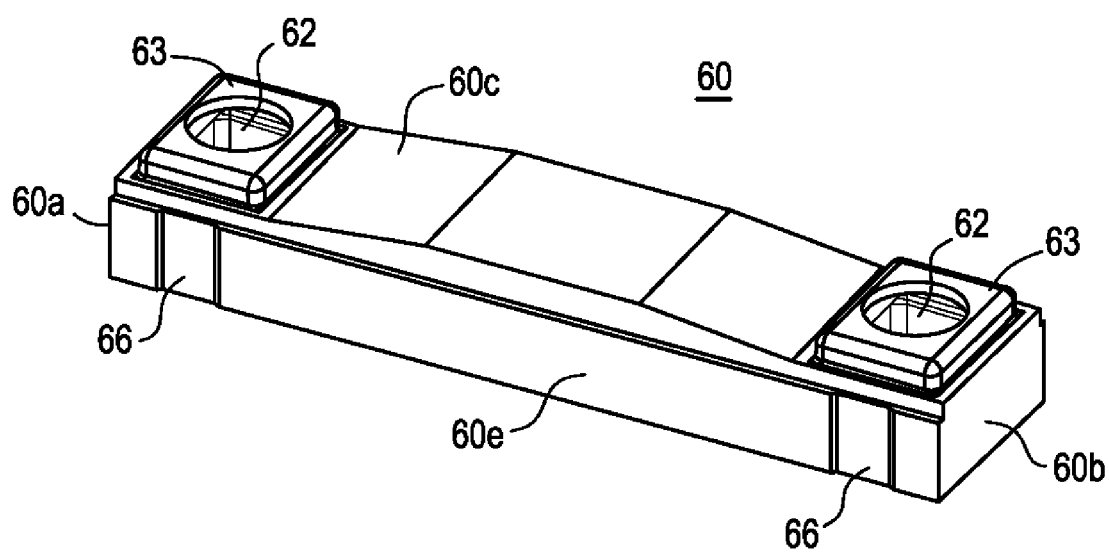
FIG. 23 is a perspective top view of a lid.

As shown in FIG. 23, the upper surface 60c of lid 60 has a flat top with angled sides. The upper surface 60c of the lid also includes the same interlocking mechanical mating features 63, 64 as described above in connection with the blocks 1, 10, 100 and the base components 30. In the case of the lid 60, the protruded portions 63 serve two functions. First, the protruding portions 63 provide mechanical mating features in connection with the corresponding openings 4 on other wall blocks 10, 100 in the same manner discussed above, which enable the lid 60 to be used in an assembly where the lid 60 is not the only topmost component, but where additional tunnel wall blocks 10, 100 are instead placed on top of the lid 60, and the walls are continued vertically upward, providing a stacked-lid arrangement (see, e.g., FIG. 29). Second, since the protruding portions 63 extend a distance of at least 0.5 in above (in the vertical direction) the overall surface geometry of the lid 60, this allows for the placement of a plywood board on top of the lid 60 to define a walkway during furnace turnarounds. Because this exists directly above the tunnel walls, the walkway allows workers access into the furnace on top of the tunnels without putting weight onto the center of the unsupported span of the lids, and instead directs all of their weight onto the tunnel walls, where it can be readily supported.

Figure 24:
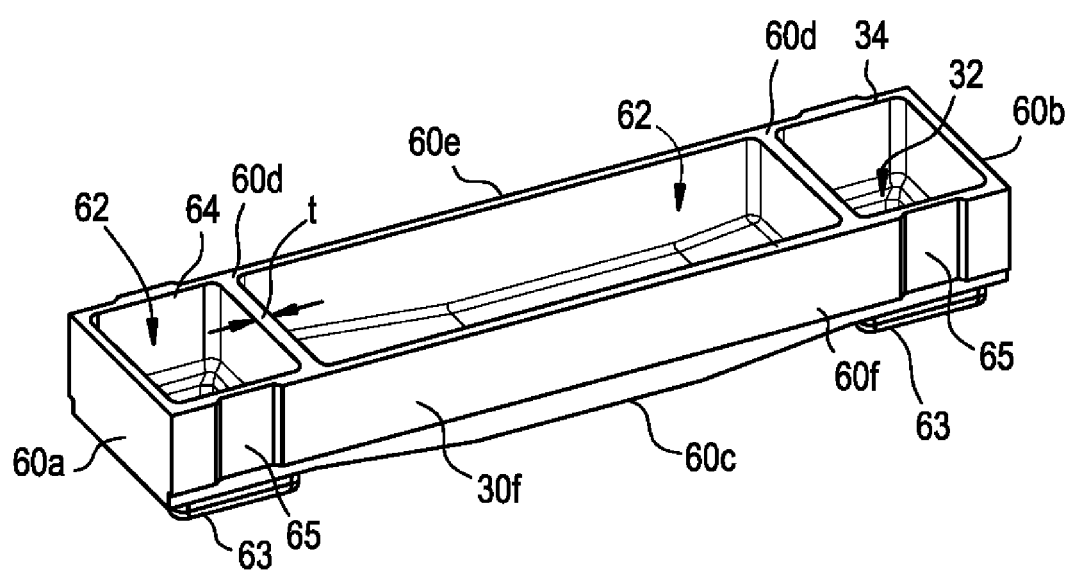
FIG. 24 is a perspective bottom view of the lid shown in FIG. 23.

The lid 60 is also hollowed out from the bottom surface 60d to remove all possible material from non-critical areas, in order to minimize the stress by improving the ratio of force per unit area of the cross section. As shown in FIG. 24, a large central cavity 62 is formed thereby, as well as two smaller cavities 62 in communication with the openings 64 defining the mechanical mating features. The mechanical mating feature (opening) 64 provides engagement with the protruded portions 3 of the blocks 10, 100 forming the walls 8 to securely attach the lid 60 to the walls 8 on either side, spanning the internal tunnel width between wall structure. The critical dimensions of the mechanical mating features are the same as discussed above. Preferably, the wall thickness "t" of the lids is in a range of 0.5 to 1.5 in, more preferably 0.625 to 0.875 in.

The lids 60 also have additional mechanical mating features such as the grooves 65 formed on side surface 30f (see FIG. 24) and protrusion or tab 66 formed on side surface 60e (see FIG. 23). These features serve the same purpose and function as the mechanical mating features/expansion gap features 5 and 6 described above in connection with the blocks 1, 10, 100 described above in connection with the base component 30. The position of these mating/expansion features 65, 66 corresponds to the mating alignment with the other lids 60 and the wall blocks 10, 100 stacked thereunder, as described below in more detail in connection with FIGS. 25-28.

Refractory Insert Members

As described above, the blocks 100 (or 1A) include one or more tabs 8 that are added, cast or pre-formed by machining, for example, on the inner surfaces (inner diameter) 7a of the through-holes 7 of the blocks 100 (see, e.g., FIGS. 16b and 16C). The tabs 8 serve as secure mating features for the specialty refractory insert members that are utilized in the tunnel system. The refractory insert members have corresponding mating features (i.e., openings/slots and grooves) that mechanically engage and/or retain the tabs if rotated (described in more detail below).

Since the through-hole or opening in the brick (block) 1A, 100 is not limited to the geometry of a circle, the corresponding overall geometry of the refractory insert member is therefore dictated by the overall geometry of the respective through-hole. A circular shape (cylindrical) is preferred. Any of the various refractory insert members according to the present invention can be used in conjunction with any through-hole location in any of the blocks 100 to define a refractory block assembly, and likewise, and such a refractory block assembly can be used in any location of the tunnel system according to the present invention. This provides a modular system and allows for a universal refractory insert-mating tab to be provided on the surface of the openings of the blocks (bricks) that can be used in conjunction with any insert in any location in the tunnel. Such flexibility allows the end user to modify the installation of refractory insert members in any manner they deem necessary depending on the particular processing concerns that they may face.

Figure 18:
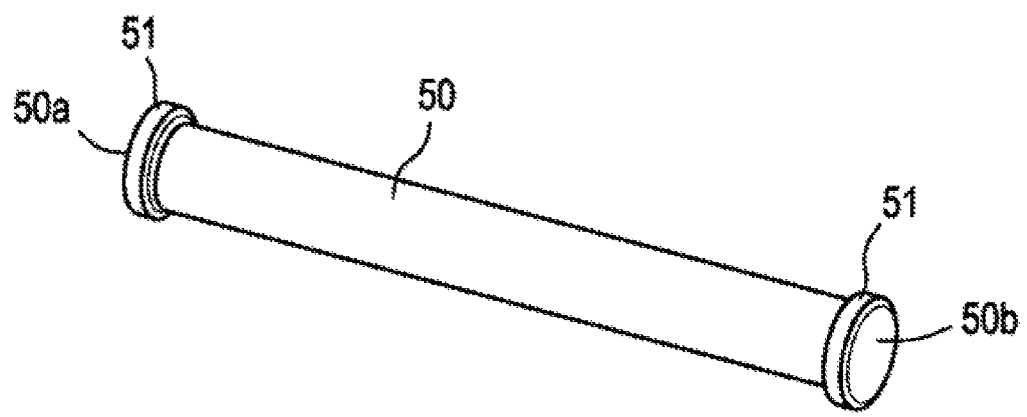
FIG. 18 is a perspective view of a tie bar (tie rod)

Tie Bars (Also Referred to Herein Interchangeably as Tie Rods and Cross Beam Supports) and Tie Bar Cradle Insert Members A tie bar is used in the tunnel assembly at various points to secure the walls in place to prevent movement, both inward and outward, as shown in FIGS. 18, 20 and 27-29. One example of a tie bar 50 (also referred to as a tie rod or cross beam support) is shown in FIG. 18. The tie bar 50 engages and supports the tunnel walls in various ways, as described below. The tie bars 50 are placed at various points in the system to improve the overall stability of the tunnels in service, as one skilled in the art can readily determine. The span of the tie bar 50 is substantially the same as the span of the top lid and the base component, which can be as small as 12 in or as wide as 60 in, although the preferred size is a range of 24 in to 36 in (corresponding to the internal width of the tunnel). It is understood that the length of the tie bar is governed strictly by the designed width of the tunnel, with clearance to allow for thermal growth. The cross-sectional diameter of the tie bar 50 is preferably 1-8 in, more preferably 3-4 in.

Figure 19A:
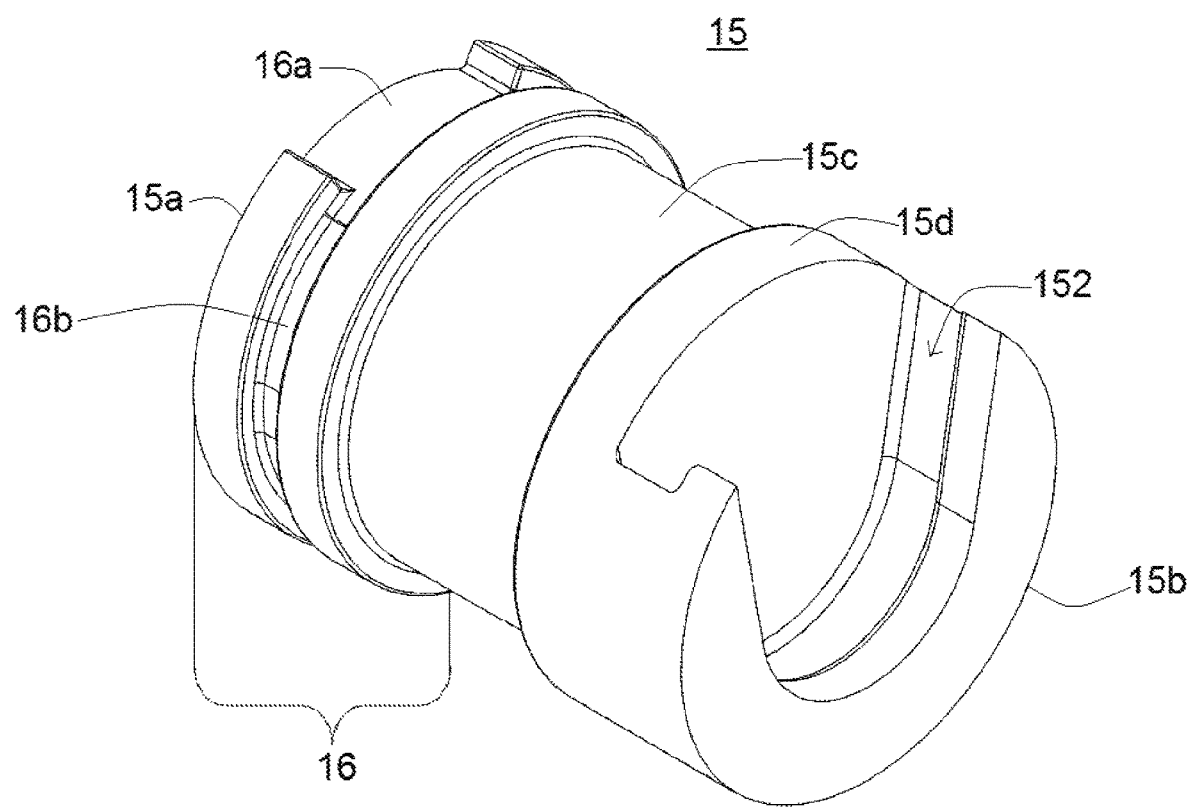
FIG. 19A is a perspective view of a tie bar cradle insert member 15 according to one aspect of the present invention.
Figure 19B:
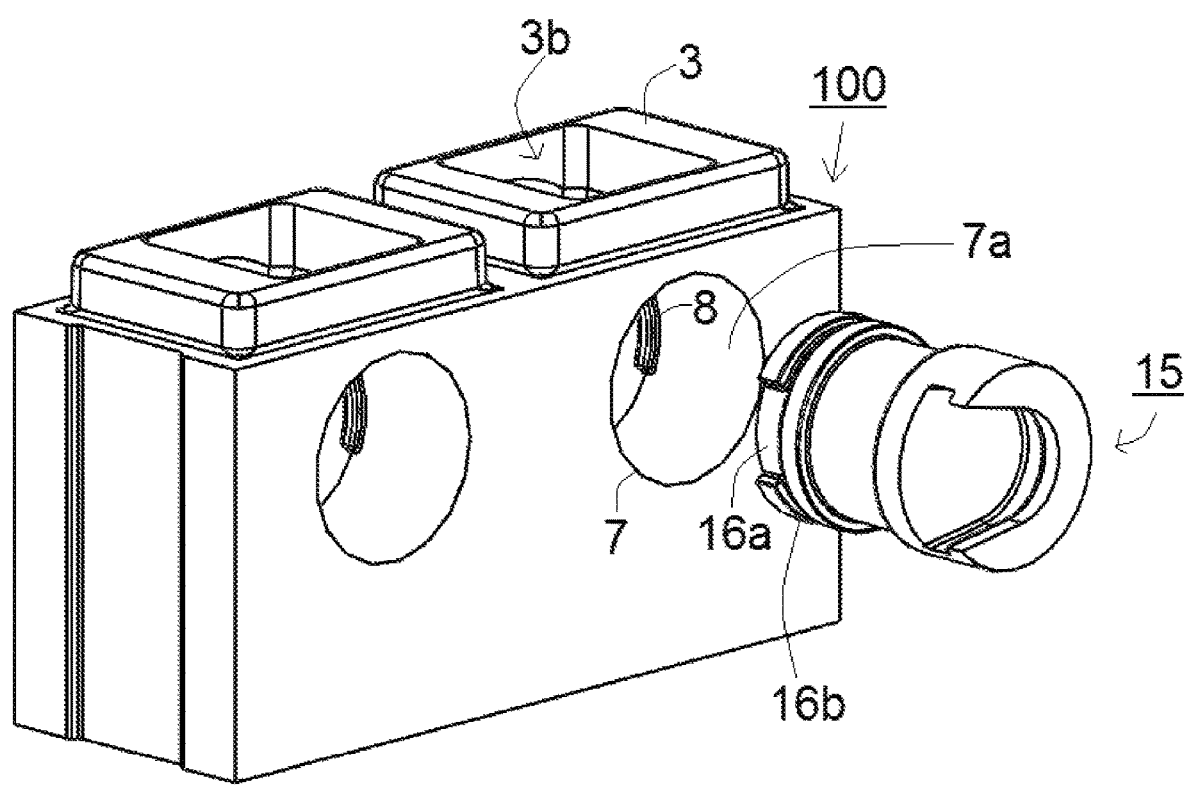
FIG. 19B is a perspective view of the full block shown in FIGS. 16A-C and a tie rod cradle insert member 15 being inserted therein.
Figure 19D:
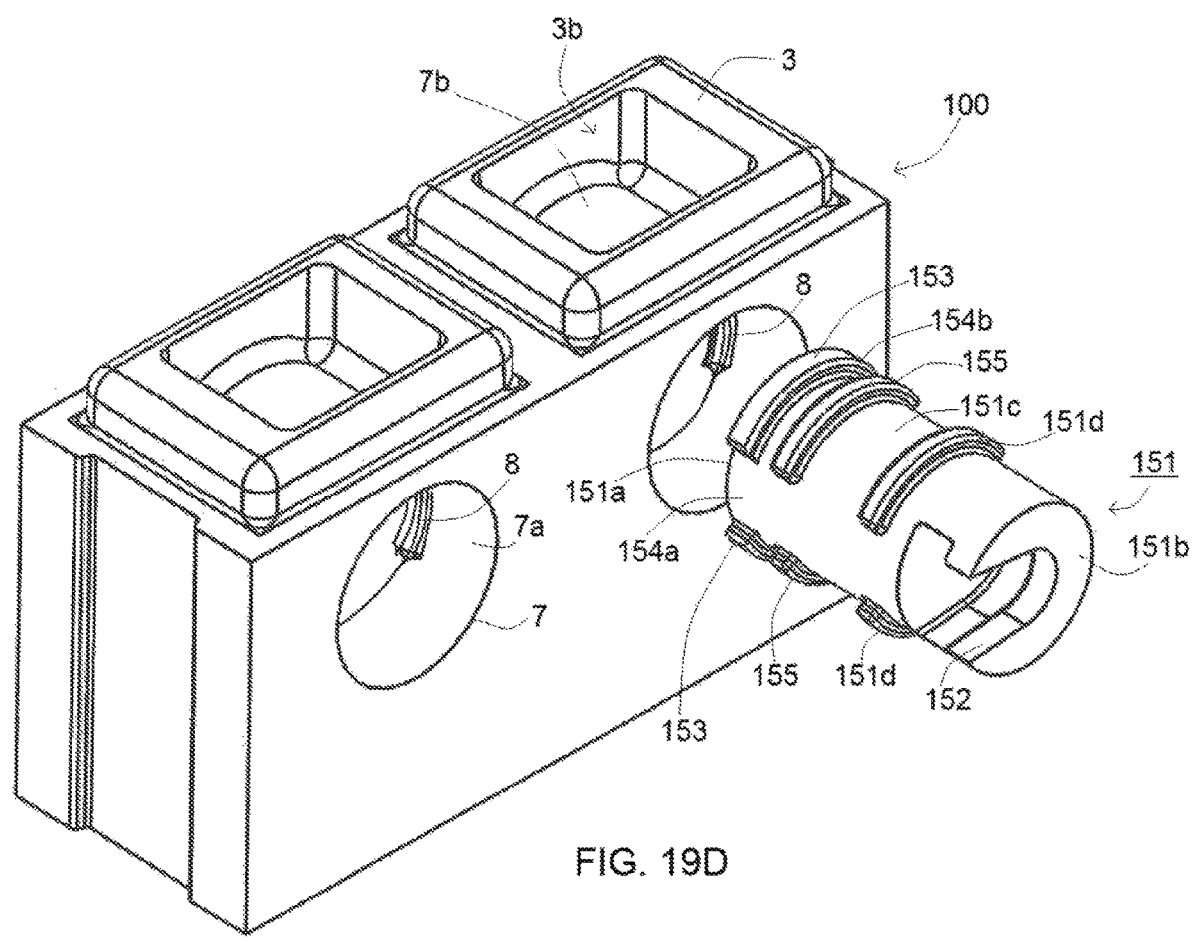
FIG. 19D is a perspective view of the full block shown in FIGS. 16A-C and a tie rod cradle insert member 151 according to another aspect being inserted therein.
Figure 19E:
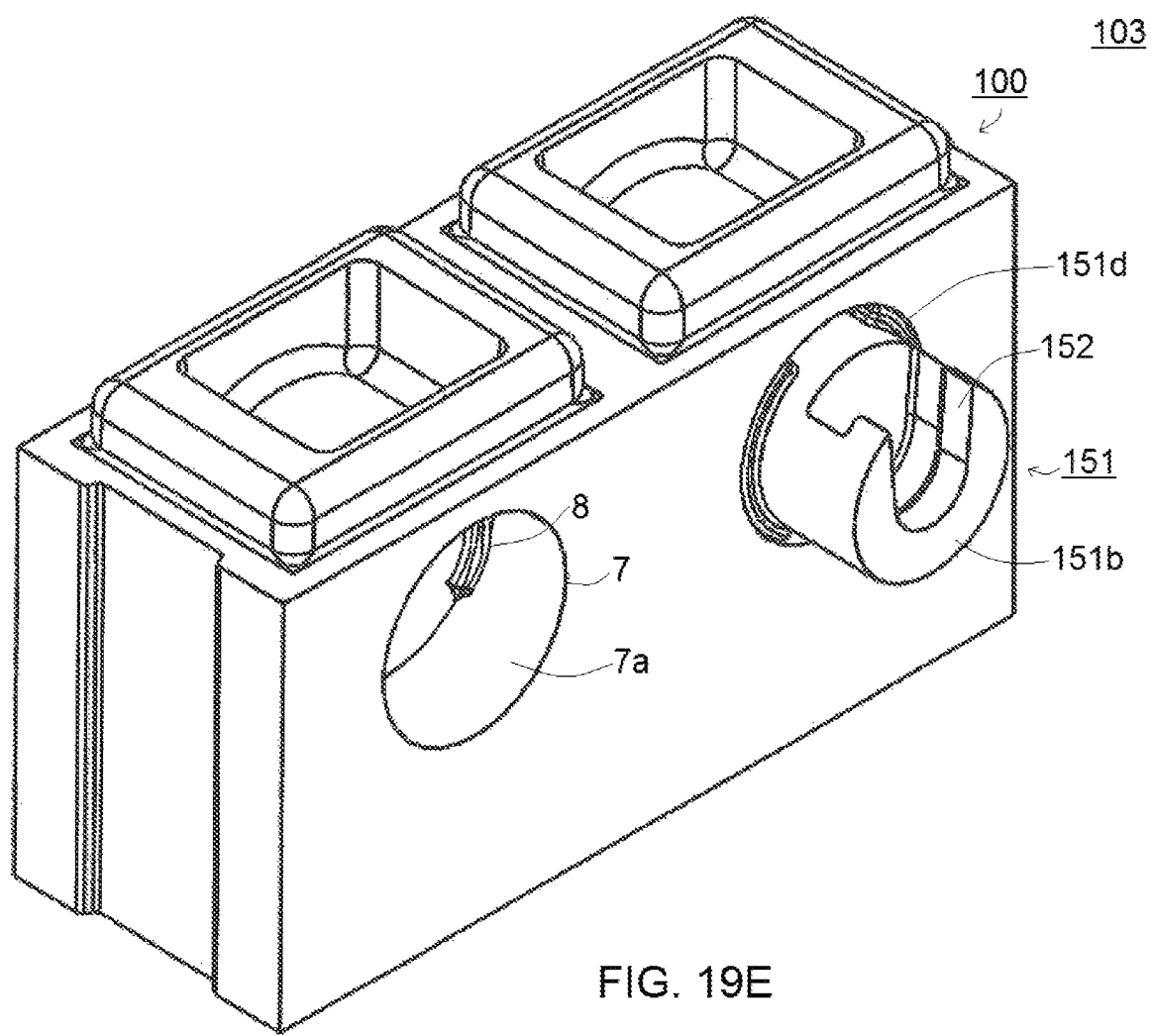
FIG. 19E is a perspective view of the assembly including the installed tie bar cradle insert member 151.

As shown in FIGS. 19A-19E, tie bar cradle insert members 15, 151 according to two different aspects of the present invention are cylindrical insert members extending from a first end (15a, 151a) toward an opposed second end (15b, 151b), and having a cylindrical central portion (15c, 151c). As shown in FIGS. 19A-19B, the first end 15a of the tie bar cradle insert 15 includes an annular rim 16 having a central groove 16b and a pair of diametrically opposed openings/slots 16a formed therein, dimensioned to accept and receive the tabs 8, and thereby serve as mechanical mating features in conjunction with the tabs 8 in the through-hole 7 of the block 100 (or 1A). As shown in FIGS. 19D-19E, the first end 151a of the tie bar cradle insert 151 includes an a pair of parallel annular rims (flanges) 153, 155 having a central groove (channel) 154b therebetween, and a pair of diametrically opposed openings 154a formed at least in the annular rim 153 (both 153 and 154, as shown) to accept and receive the tabs 8, and thereby serve as mechanical mating features in conjunction with the tabs 8 in the through-hole 7 of the block 100.

The size of the openings/slots 16a, 154a is preferably about 60° or more (at least slightly bigger than the tabs 8) with respect to the circumference of the refractory insert member 15, 151 and the circumference of the through-hole 7, but the critical dimension is dependent mainly upon the size of geometry of the tab 8, and vice versa. One skilled in the art can appreciate the factors needed to design a properly interlocking slot and tab mechanism in the context of the present invention in connection with the disclosure provided herewith. The tie bar cradle inserts 15, 151 are inserted into the through-hole 7 so that the slots 16a, 154a by-pass the tab 8 cast on the inner diameter 7a of the block 100. The tie bar cradle insert 15, 151 are then rotated a sufficient amount, preferably about 90 degrees, far enough to secure it in place in the groove 16b, 154b, from which it cannot readily disengage.

Figure 20:
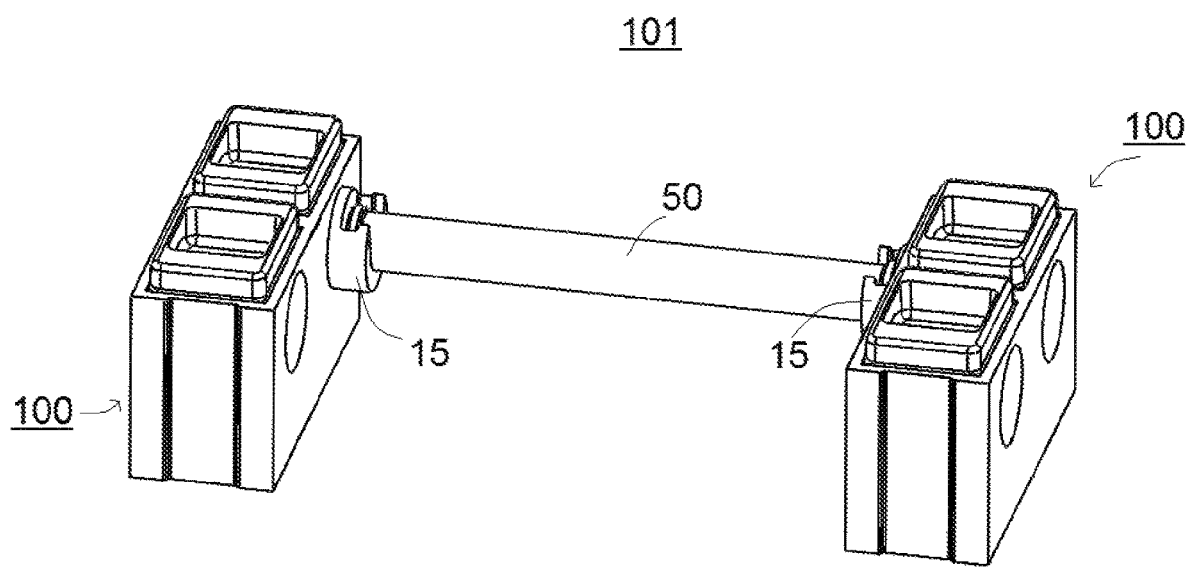
FIG. 20 is a perspective view of two full blocks according to FIGS. 16A-C and a tie rod according to FIG. 18 situated in the respective tie bar cradles 15 defining an assembly and spanning the horizontal distance between the opposed blocks.

The respective second ends 15b, 151b of the respective tie bar cradle inserts 15, 151 include a semi-cylindrical portion having interior annular rim features 152 to guide, receive and retain the corresponding annular flanges 51 at the ends 50a, 50b of the tie bar 50 when vertically positioned into place therein (see, e.g., FIG. 20). Again, the design of this portion of the tie bar cradle insert 15, 151 depends on the corresponding geometry of the outer peripheral shape of the flange portions 51 of the respective tie bar 50, which could conceivably have differing geometrical configurations (i.e., it is not limited to the circular-shaped flange shown in FIG. 18, but could have any kind of polygon-shaped or elliptical lip at the end thereof). In both embodiments, there is a shoulder portion, such as a stopper flange 15d, 151d provided between the central cylindrical portion 15c, 151c that is housed within the though-hole 7 and the semi-cylindrical portion that cradles the tie bar 50. The outer diameter of the tie bar cradle insert is slightly smaller than the inner diameter of the through-hole of the block to allow for proper insertion but to substantially prevent excess gas flow around the outside of the insert.

As described above, the tie bar cradle inserts 15, 151 of the tie bar assembly 101 are installed into the through-hole 7 in the block 100 so that corresponding mating features (e.g., slots, openings 16a, 154a) provided on the outer section by-pass the tab 8 on the inner surface 7a of the through-hole 7 of the block 100. The tie bar cradle insert 15, 151 is then rotated far enough, preferably about 90 degrees, to fully engage the tabs 8 within the grooves 16b, 154b and secure it in place (see, e.g., FIG. 19C). This defines a refractory block assembly 102 (FIG. 19C) or 103 (FIG. 19E). Another tie bar cradle insert is also installed in an opposite-facing block on an opposed (facing) portion of the tunnel wall (see, e.g., FIG. 27), so that tie bar cradle inserts 15, 151 are provided in matching locations on the inside faces of both tunnel walls, and then a tie bar 50 (FIG. 18) is installed into the cradle that has been created thereby to define the tie bar assembly 101 (including at least refractory block assemblies 102 and/or 103 and a tie bar 50; see FIGS. 20 and 27). It should be noted that anther refractory insert can be used in a different hole of the same block that is otherwise included in an assembly 102, 103 with the tie bar cradle insert member according to the present invention (see, e.g., FIG. 27, wherein a tie bar assembly 101 is then added to the same blocks 100 already defining refractory assemblies 104" (including blocks 100 and an insert 230; see also FIG. 26).

Tie bar cradle inserts 15, 151 can be installed in refractory blocks 100 and positioned at various locations along the tunnel walls when the tunnel walls are built, and then tie bars 50 can be readily added during installation, or later removed as needed without requiring substantial down time or creating deleterious maintenance issues. Once fully installed, this tie bar assembly 101 prevents the tunnel walls from moving horizontally in either direction (see FIGS. 27-29).

Flow Restricting/Constricting Plugs Refractory Insert Members (Plugs)

Another refractory insert according to the present invention is referred to as a flow restricting or flow constricting plug (hereinafter referred to simply as "plugs," or "refractory insert plugs"). As shown in FIGS. 21A-F, the refractory insert plugs 130, 136, 230 and 330 are essentially refractory annular rings with openings of various sizes (see, e.g., FIGS. 21A-E) formed in the respective central portions thereof, or alternatively, solid pucks 430 (see, e.g., FIG. 21F). The refractory insert plugs are inserted into the through-holes 7 of the blocks 100, and which have corresponding mechanical mating features, such as openings/slots (FIGS. 21B, 21C) or openings/slots and grooves (FIG. 21A, 21D-21F) that by-pass and then mechanically engage the tabs 8 on the inner diameter 7a of the through-hole 7 in the block 100. The outer diameter of the refractory insert plug is slightly smaller than the inner diameter of the through-hole of the block to allow for proper insertion but to substantially prevent excess gas flow around the outside of the insert.

Figure 21A:
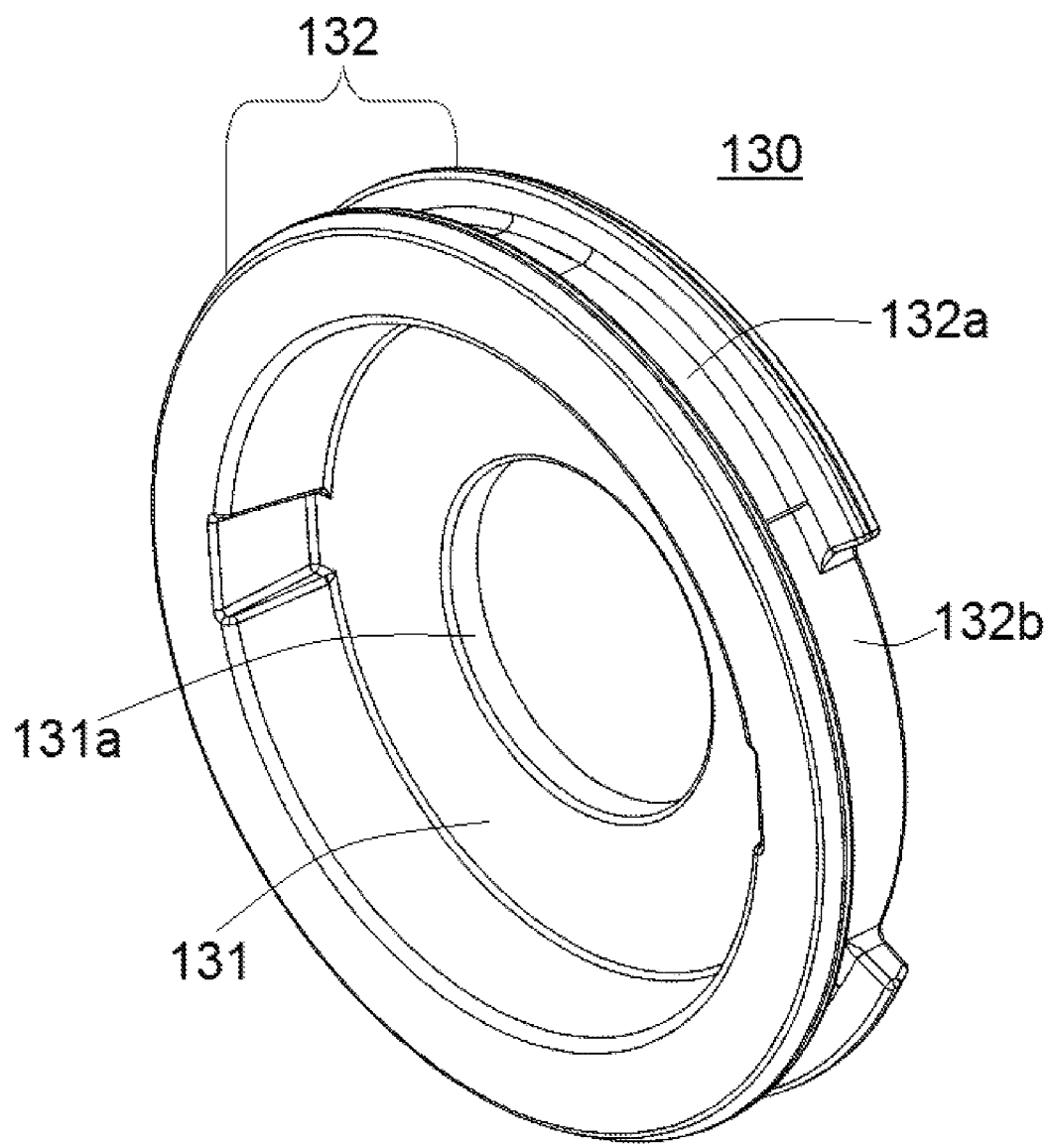
FIG. 21A is a perspective view of a flow constricting plug insert member 130 according to one aspect of the present invention.
Figure 26:
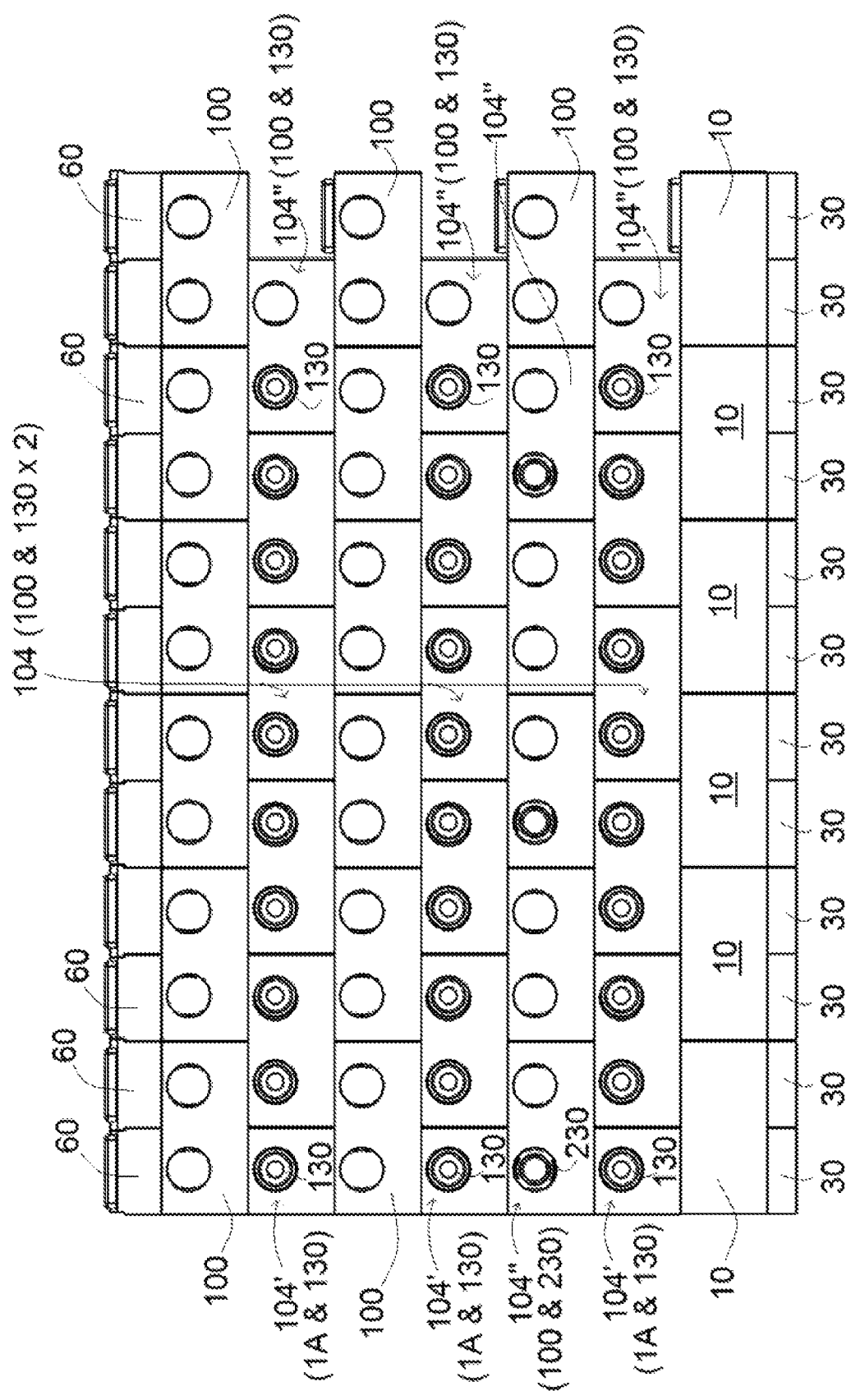
FIG. 26 is a side view of the tunnel assembly shown in FIG. 25.

As shown in FIG. 21A, according to one aspect of the present invention, the refractory insert plug 130 has a central disc-shaped portion 131 with an opening 131a in the central portion thereof to permit gas flow. An annular rim (flange) 132 circumscribes the central portion 131 and defines a pair of opposed openings 132b (preferably around about 60° or more (at least slightly bigger than the tabs 8) and a groove (channel) 132a communicating therebetween. The groove (channel) 132a is dimensioned to receive and securely retain the tabs 8. The refractory insert plug 130 in FIG. 21A can be installed from either the inside or the outside of the tunnel by simply turning it sideways, inserting it so that the opening (slot) 132b will bypass the tabs 8 on the inner diameter 7a of the block 100 through-holes 7, and then rotating it far enough, preferably about 90°, into place so that the tabs 8 then securely reside within the groove 132a. A refractory assembly 104 (including a block 100 having two refractory insert plugs 130 installed in the through-holes thereof) is shown in FIG. 26. An example of a refractory assembly 104' including half-block 1A with a refractory insert plug 130 installed in the through-hole thereof is also shown in FIG. 26.

Figure 21B:
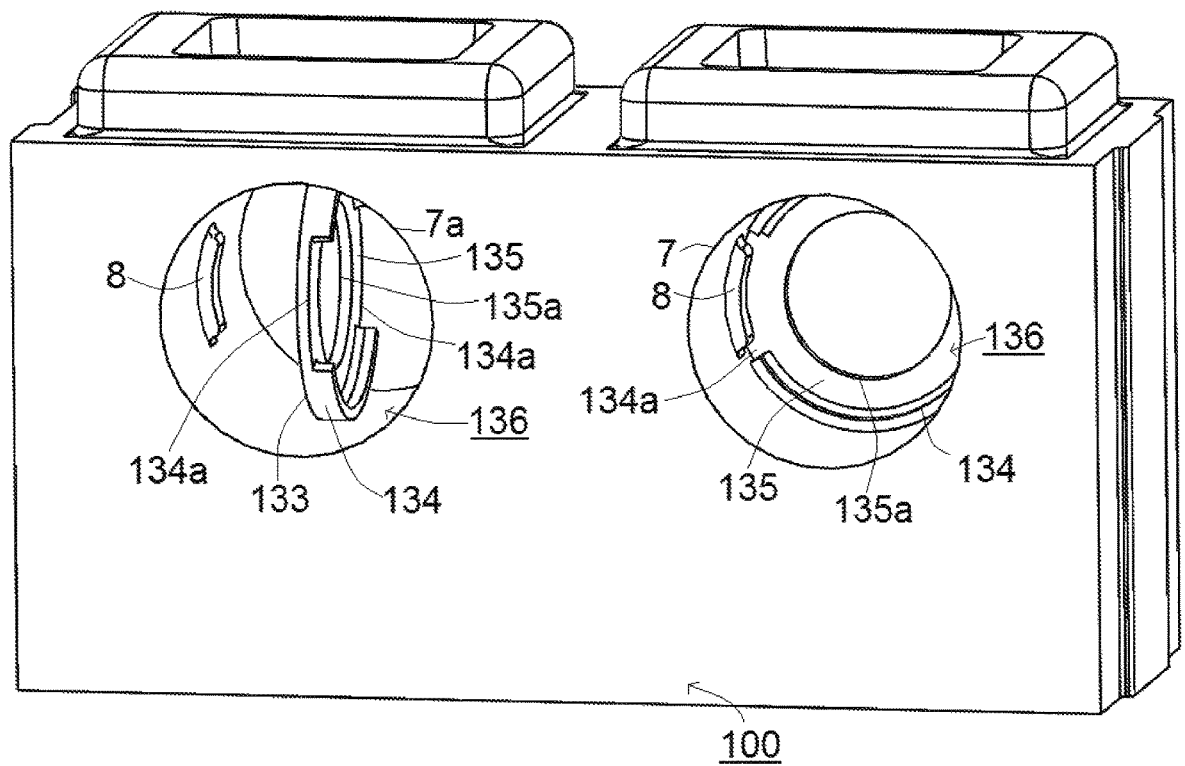
FIG. 21B is a perspective view of a flow constricting plug insert member 136 according to another aspect of the present invention being installed in the block 100 shown in FIG. 16.
Figure 21C:
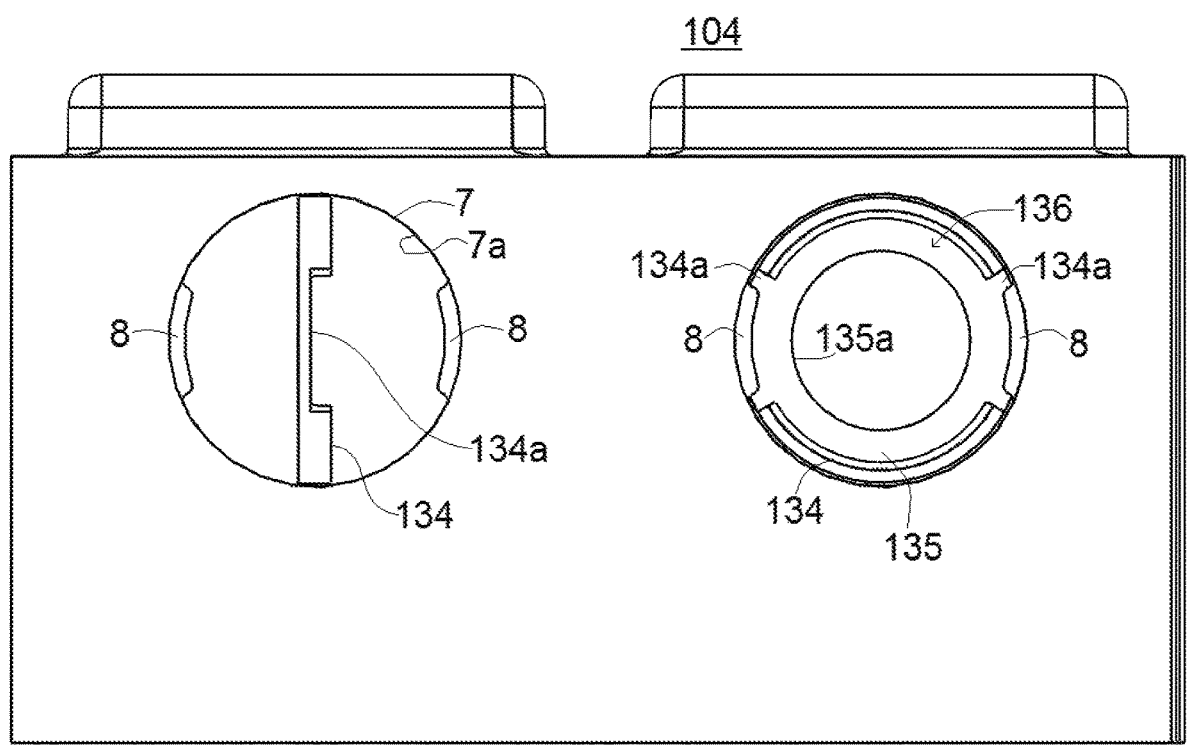
FIG. 21C is a front view of the installation process shown in FIG. 21C.
Figure 21D:
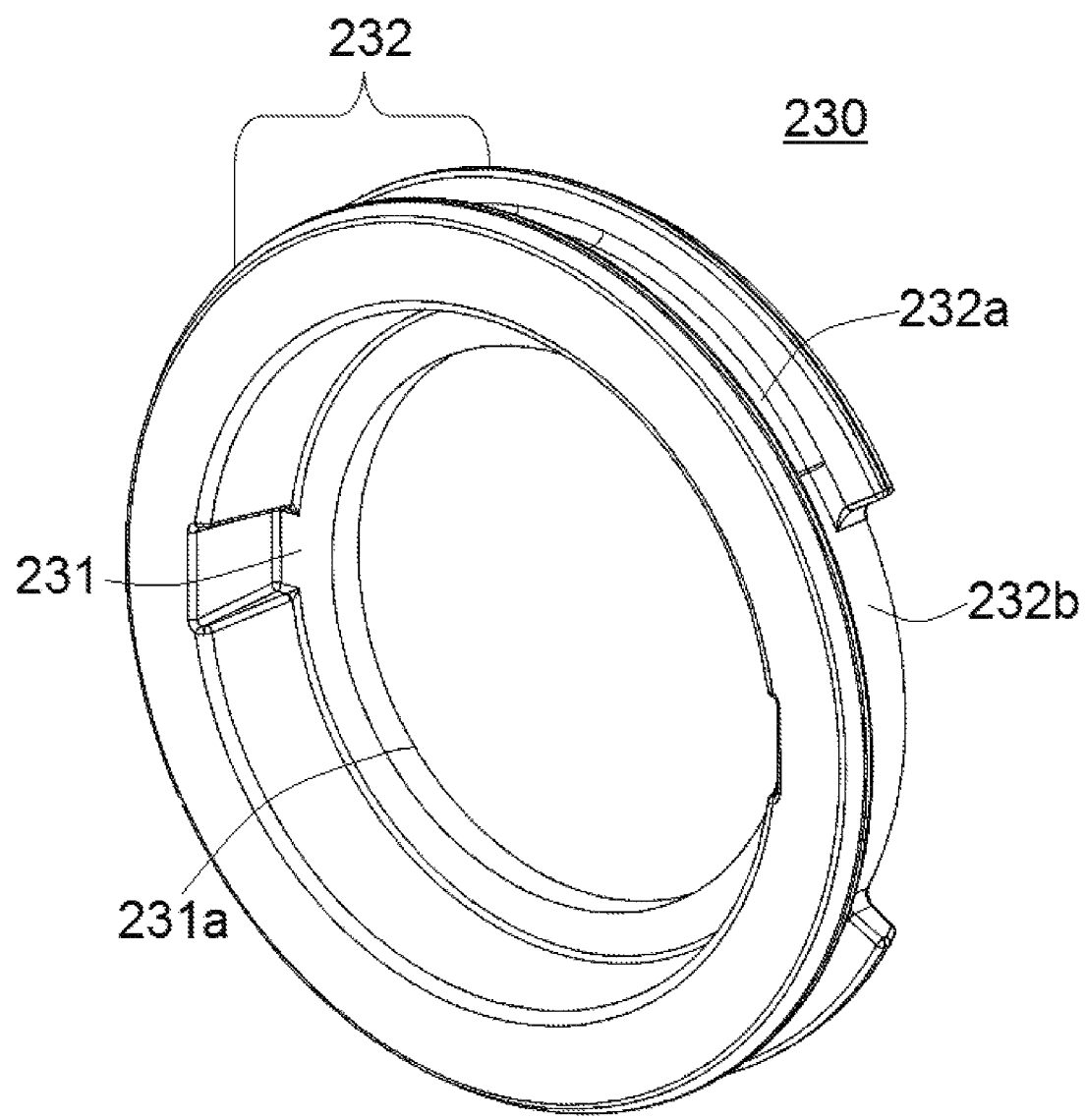
FIG. 21D is a is a perspective view of a flow constricting plug insert member 230 according to another aspect.

FIG. 21D shows a refractory insert plug according to another aspect of the present invention. The refractory insert plug 230 has a central disc-shaped portion 231 with an opening 231a in the central portion thereof to permit gas flow. The opening 231a is larger than the opening 131a shown in FIG. 21A. An annular rim (flange) 232 circumscribes the central portion 231 and defines a pair of opposed openings 232b (preferably around about 60° or more (at least slightly bigger than the tabs 8) and a groove (channel) 232a communicating therebetween. The groove 232a is dimensioned to receive and securely retain the tabs 8. The refractory insert plug 230 in FIG. 21D can be installed from either the inside or the outside of the tunnel by simply turning it sideways, inserting it so that the opening (slot) 232b will bypass the tabs 8 on the inner diameter 7a of the block 100 through-holes 7, and then rotating it far enough, preferably about 90°, into place so that the tabs 8 then securely reside within the groove 232a. A refractory assembly 104" (including a block 100 having a refractory insert plug 230 installed in at least one through-hole thereof) is shown in FIG. 26.

Figure 21E:
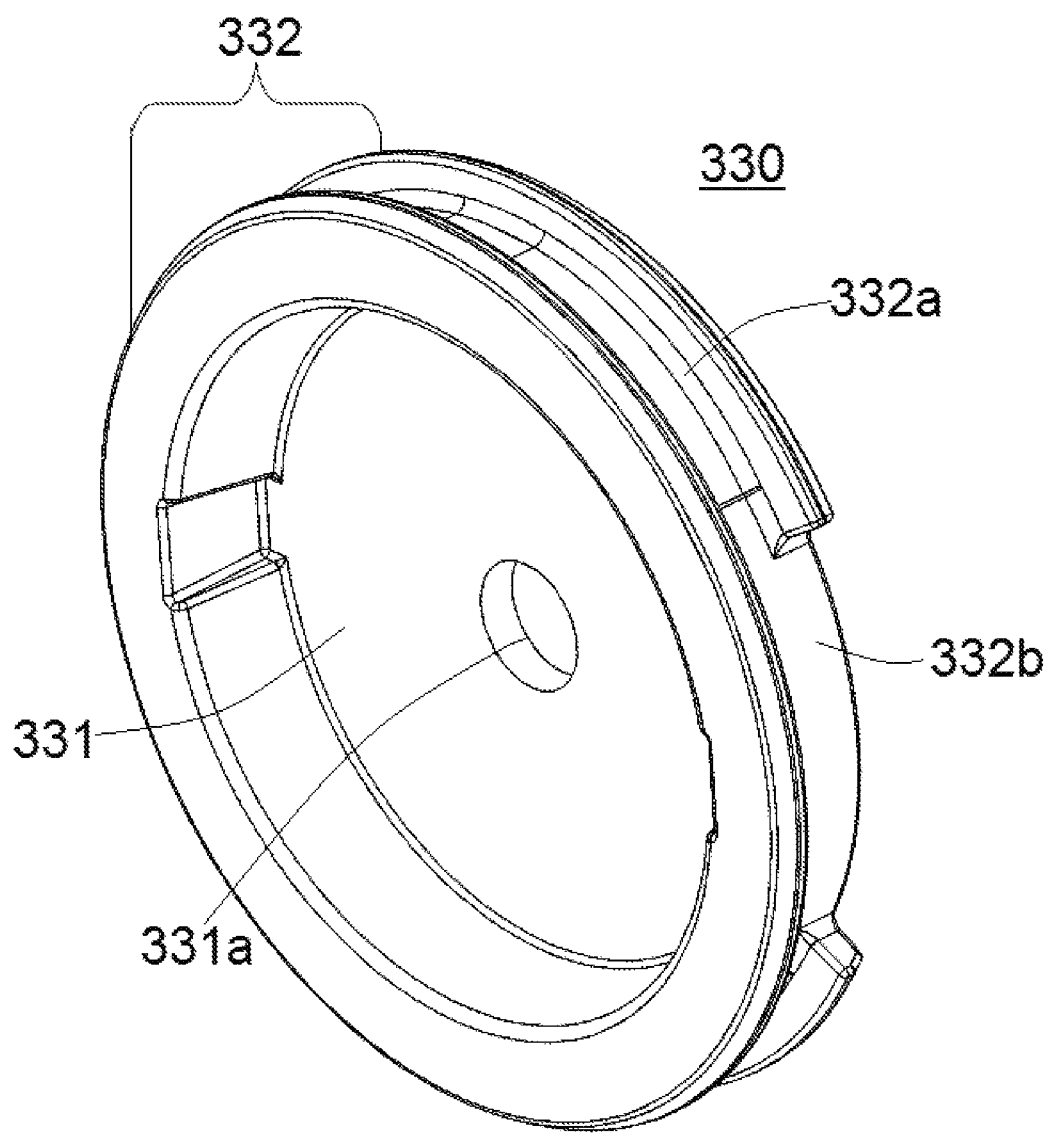
FIG. 21E is a is a perspective view of a flow constricting plug insert member 330 according to another aspect.

FIG. 21E shows a refractory insert plug according to another aspect of the present invention. The refractory insert plug 330 has a central disc-shaped portion 331 with an opening 331a in the central portion thereof to permit gas flow. The opening 331a is much smaller than the openings 131a and 231a shown in FIGS. 21A and 21D. An annular rim (flange) 332 circumscribes the central portion 331 and defines a pair of opposed openings 332b (preferably around about 60° or more (at least slightly bigger than the tabs 8) and a groove (channel) 332a communicating therebetween. The groove 332a is dimensioned to receive and securely retain the tabs 8. The refractory plug 330 in FIG. 21E can be installed from either the inside or the outside of the tunnel by simply turning it sideways, inserting it so that the opening (slot) 232b will bypass the tabs 8 on the inner diameter 7a of the block 100 through-holes 7, and then rotating it far enough, preferably about 90°, into place so that the tabs 8 then securely reside within the groove 332a.

Figure 21F:
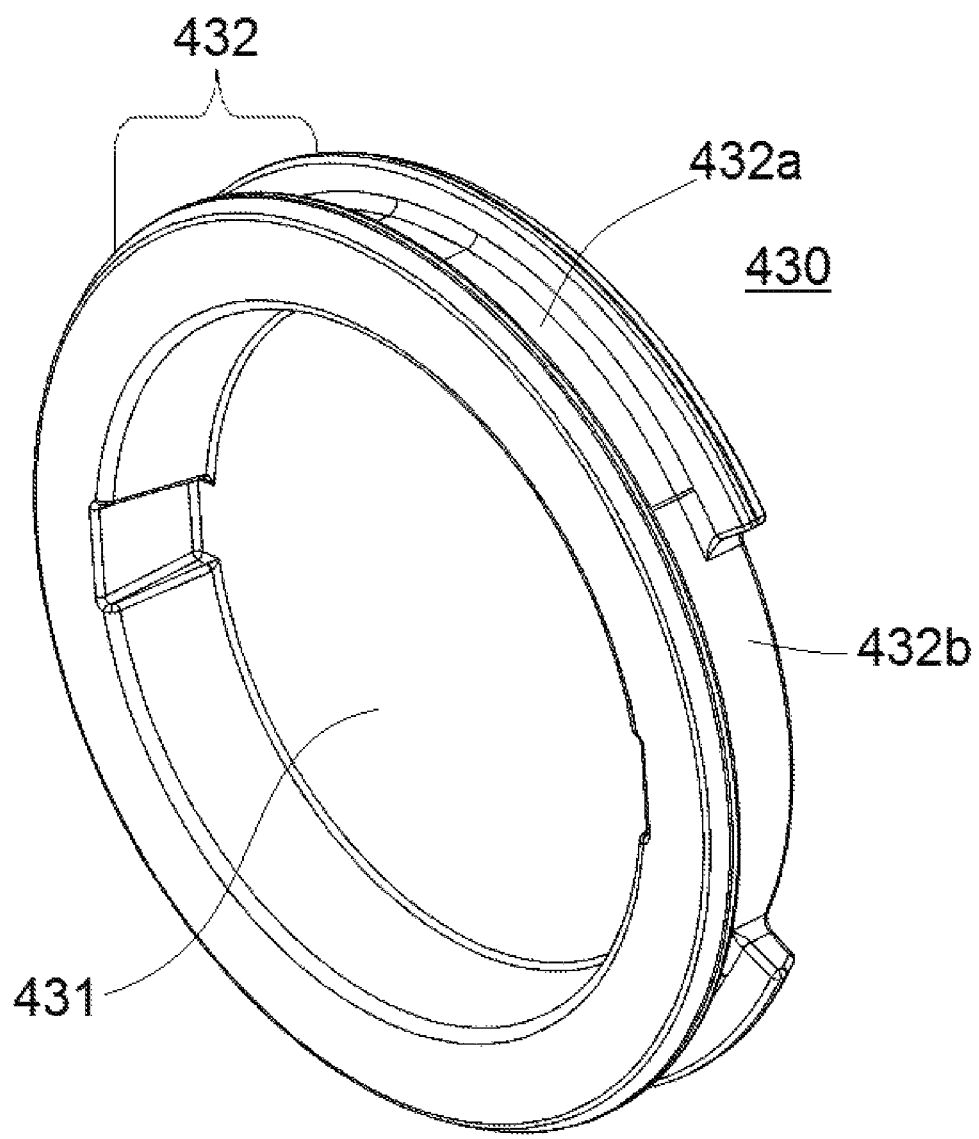
FIG. 21F is a is a perspective view of a flow restricting plug insert member (puck) 430 according to another aspect.

FIG. 21F shows a refractory insert plug according to another aspect of the present invention, also referred to as a puck. The refractory insert plug 430 has a solid central disc-shaped portion 431, without any openings formed therein, in order to restrict gas flow. An annular rim (flange) 432 circumscribes the central portion 431 and defines a pair of opposed openings 432b (preferably around about 60° or more (at least slightly bigger than the tabs 8) and a groove (channel) 432a communicating therebetween. The groove 432a is dimensioned to receive and securely retain the tabs 8. The plug 430 in FIG. 21D can be installed from either the inside or the outside of the tunnel by simply turning it sideways, inserting it so that the opening (slot) 432b will bypass the tabs 8 on the inner diameter 7a of the block 100 through-holes 7, and then rotating it far enough, preferably about 90°, into place so that the tabs 8 then securely reside within the groove 432a.

Figure 22A:
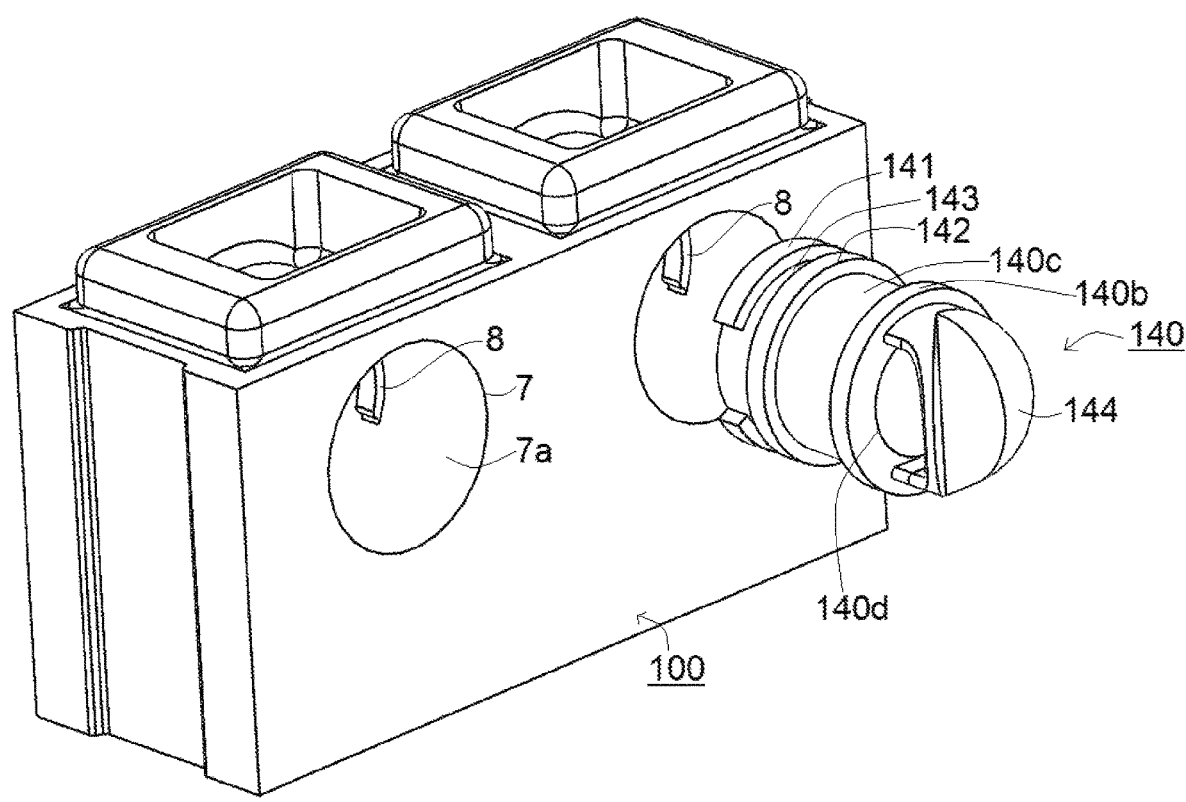
FIG. 22A is a perspective view of a flow directing cup insert member according to the present invention and a block shown in FIG. 16.
Figure 22B:
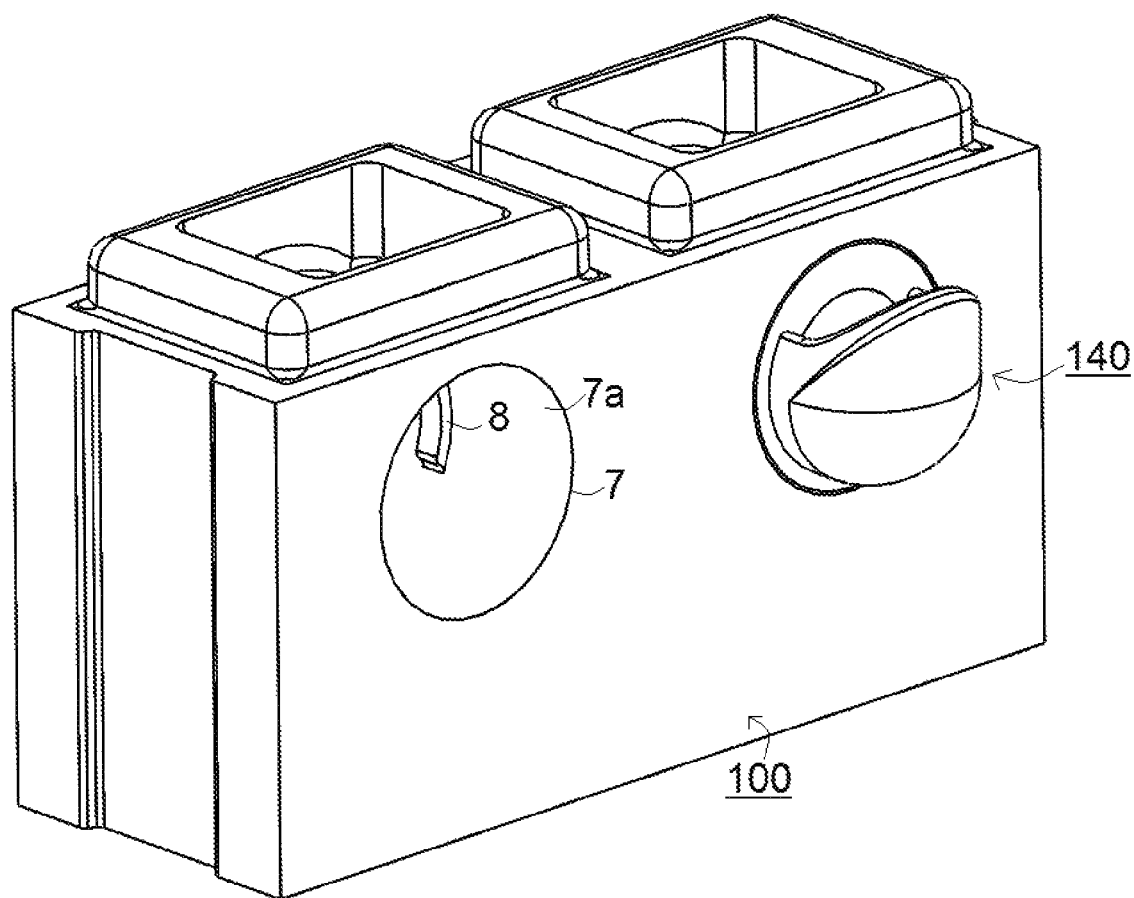
FIG. 22B is a perspective view of the flow directing cup insert member installed in the block.

The refractory block assembly 105 shown in FIG. 22B includes the flow directing cap insert member 140 installed in the block 100. Another flow directing cap insert 140, or a different type of refractory insert member, can be inserted in the other through-hole 7 to define a double assembly within the same block.

As shown in FIGS. 21B and 21C, according to another aspect of the present invention, the refractory insert plug 136 has a central disc-shaped portion 135 with an opening 135a in the central portion thereof to permit gas flow. An annular rim (flange) 134 circumscribes the central portion 135 and defines a pair of opposed openings 134b (preferably around about 60° or less with respect to the circumference of the puck and the through-hole 7). As shown in FIGS. 21B and 21C, refractory insert plugs 136 can be installed either from the outside of the tunnel, by simply sliding into place, or from inside the tunnel, by turning them sideways, inserting them so that the opening 134 bypasses the tabs 8 on the inner diameter 7a of the block 100 through-holes 7, and then pulling them back into place. The tab 8 will sit within the opening 134 and maintain proper orientation of the insert member. The refractory plugs 136 can be secured in place with either compressed high temperature fiber, or a thin bead of mortar.

The refractory block assembly 104 shown in FIGS. 21B and C includes the refractory insert plugs 136 installed in the block 100. A different refractory plug member, or an altogether different type of refractory insert member, can be substituted for one of the inserts 136 and inserted in the other through-hole 7 to define a different double assembly within the same block 100, or one of the inserts 136 can be removed to define a single assembly. As shown in FIGS. 25-29, refractory assemblies including one or more types of refractory plug members (e.g., 130, 230) in blocks 1A or 100 are referred to as refractory assemblies 104, 104' and 104".

As shown in FIG. 21F, when the central portion of the refractory insert plugs (430) is instead entirely solid (i.e., pucks), these refractory insert members serve to prevent any gas flow from passing through the respective through-hole 7 in the block 100. FIGS. 21A, 21D and 21E show embodiments of plugs as annular rings with central openings of various sizes, which dictate the amount of gas flow that will be permitted to enter the tunnel at that given location. It should be noted that these embodiments can be designed to be inserted and fixed in accordance with either method discussed above (i.e., the twist-lock method of FIGS. 21A and 21D-F, or the slide-in and fix method of FIGS. 21B, 21C).

Any of the refractory insert plugs according to the present invention can be removed and or replaced with another refractory insert plug having a different configuration (i.e., a different central ring size opening or a solid puck) after the original installation, if it is deemed necessary by the end user to alter the flow dynamics.

Flow Directing Cap Insert Member

Another refractory insert member according to the present invention is a flow directing cap 140 (FIGS. 22A and 22B). As shown, the flow directing cap 140 is a hollow, substantially cylindrical member 140 includes an open first end 140a, and opposed second end 140b (having an opening 140d) and a central cylindrical portion 140c. The outer diameter of the flow directing cap insert is slightly smaller than the inner diameter of the through-hole 7 of the block to allow for proper insertion but to substantially prevent excess gas flow around the outside of the insert. The outer peripheral surface of the first end 140a is provided with corresponding mechanical mating features (e.g., openings/slots 141a) that by-pass and mechanically engage with the tabs 8 on the inner diameter 7a of the through-hole 7 in the brick (block) 100 in the same manner as the tie bar cradle insert 15, 151 described above. Specifically, the first end 140a is an annular flange 141 and a parallel annular flange 142 defining a groove or channel 143 therebetween. At least the flange 141 includes a pair of diametrically opposed openings (slots) 141a that are sized appropriately to allow the tabs 8 to pass therethrough. Preferably, the slots are around about 60° or more (at least slightly bigger than the tabs 8) with respect to the circumference of the flow directing cap insert 140 and the through-hole 7. The space (groove, channel) 143 between the parallel flanges 141 and 142 is dimensioned to accept securely retain the tabs 8 therein once the flow directing cap insert member 140 is rotated far enough, preferably about 90 degrees.

The second end 140b of the flow directing cap insert includes an annular lip and the opening 140d. A hooded, cup-like portion 144 is provided to obscure or otherwise cover a portion of the opening 140d so as to direct the gas flow exiting therefrom. The hooded, cup-like portion can be made to have any opening angle needed, as described, for example, in connection with U.S. Pat. No. 8,439,102, and/or insert members 140 having a single or mixed types of angle-openings can be arranged in through-holes at different locations to control the flow by changing the orientation of the hood opening/angle.

The refractory block assembly 105 shown in FIG. 22B includes the flow directing cap insert member 140 installed in the block 100. Another flow directing cap insert 140, or a different type of refractory insert member, can be inserted in the other through-hole 7 to define a double assembly within the same block.

In effect, the flow directing cap insert member 140 enables the flue gas that passes therethrough to be redirected in a specific direction, other than in a direct line with the through-hole of the block, as dictated by the needs of the end user, and can be placed in any location in the tunnel system that is needed to alter the flow dynamics.

The Tunnel Assembly (Also Referred to Interchangeably Herein as a Tunnel)

As shown in FIGS. 25-28, the tunnel assembly 200 includes a plurality of base components 30 are arranged to extend horizontally (in a first direction or the horizontal arrangement direction, i.e., defining a width of the tunnel) and are aligned with respect to one another to define a substantially continuous base surface along the longitudinal extension direction (length) of the tunnel. The base components 30 are secured to one another via the mechanical mating members 35, 36 (preferably without any mortar). A plurality of wall-forming blocks 10 are vertically stacked onto the base components 30 on both opposed sides, along the longitudinal extension direction of the tunnel, which helps further secure the base components 30 in place. The blocks 10 are arranged in a sequentially off-set manner, by one half of a length on the base components 30, using the respective mechanical mating members 33 (protruding portions from the base components 30) and 4 (openings on the blocks 10) to securely fasten the blocks 10 into place on the base components 30 without the use of mortar. The blocks 10 are also secured to one another via the respective mechanical mating members 5, 6. A plurality of blocks 1A, 100 are then stacked vertically and along the longitudinal extension direction on the row of blocks 10 in a similar, half-block off-set manner.

Additional blocks 1A, 100 are then alternately stacked onto one another, secured to one another vertically and horizontally, preferably without mortar, via the respective mechanical mating members 3, 4, 5 and 6, continuing in a half-block, off-set manner, to define two parallel, vertically oriented tunnel walls 8 that extend both in the second (i.e., vertical arrangement direction) from the base components 30 and in the longitudinal extension direction of the tunnel. As shown, some of the blocks correspond to the blocks 10 shown in FIG. 11 (without through-holes 7), and some of the blocks correspond to the blocks 100 shown in FIG. 16, which include through-holes 7. Blocks 1A are otherwise the same as those shown and described as blocks 1 in FIG. 10, with the exception of the though-hole that is included in blocks 1A.

The tunnel walls 8 are spaced a predetermined distance (i.e., 12-60 in, preferably 24 to 36 in) apart from one another in the horizontal arrangement direction, dictated by the horizontal span of the base components 30. Tie bars 50 are inserted into refractory insert members (tie bar cradles 15 or 151) in desired locations, as needed. Other refractory insert members, such as refractory plug inserts 130, 136, 230, 330, or 430, and flow directing cap insert members 140 can also be inserted into the through-holes 7 of the blocks 100 in the any location that is desired to define refractory block assemblies at those points (see, e.g., FIG. 26). The tunnel assembly is secured by placing a plurality of lids 60 across the tops of the tunnel walls 8, which are secured in place onto the uppermost blocks 10 via the mechanical mating features (e.g., openings 64 in the lids and the protruding portions 3 of the wall blocks 10), and further secured to one another via the mechanical mating members 65, 66 in the lids 60 to construct the tunnel 200 (also referred to as a tunnel assembly 200 or 200A, see, e.g., FIGS. 25-29).

As discussed above, in the tunnel 200 according to the present invention, reducing the weight of all of the components, while maintaining the structural integrity of each of the individual components, makes it possible to eliminate much of the crushing force on the lower courses of the brick (i.e., the base components 30). Providing light-weight, structurally correct cover (lid) components 60 overcomes the drawbacks previously associated with making conventional lids thicker in order to be stronger, which also detrimentally added additional load to the entire system. The incorporation of controlled expansion gaps between each brick and elimination of mortar from the overall system ensures that the tunnel assembly 200 can expand and contract without creating large cumulative stresses, and reduces the installation time of the tunnel assembly 200, 200A as a whole.

With the reduced wall thickness and improved materials used for the components, the light-weight tunnel lids 60 can be easily installed or removed simply by two laborers. In addition, the light-weight, mortar-free blocks with interlocking mechanical mating features are easily handled by a single laborer, and the tunnel structure 200 can assembled, repaired and/or disassembled as necessary without significant consequences or the requirement for high levels of skill. Cross beam supports (i.e., tie bars 50 in respective cradle inserts), as well as other refractory insert members, such as flow restricting/constricting plugs and flow directing caps, can be easily added or removed from the blocks (block assemblies) in the tunnel assembly 200 without limiting access to other tunnel components during turnarounds, ensuring that repairs can be complete and effective. Faster installation and repair time also allows for proper repairs to be made more readily, improving the overall reliability of the system.

Figure 27:
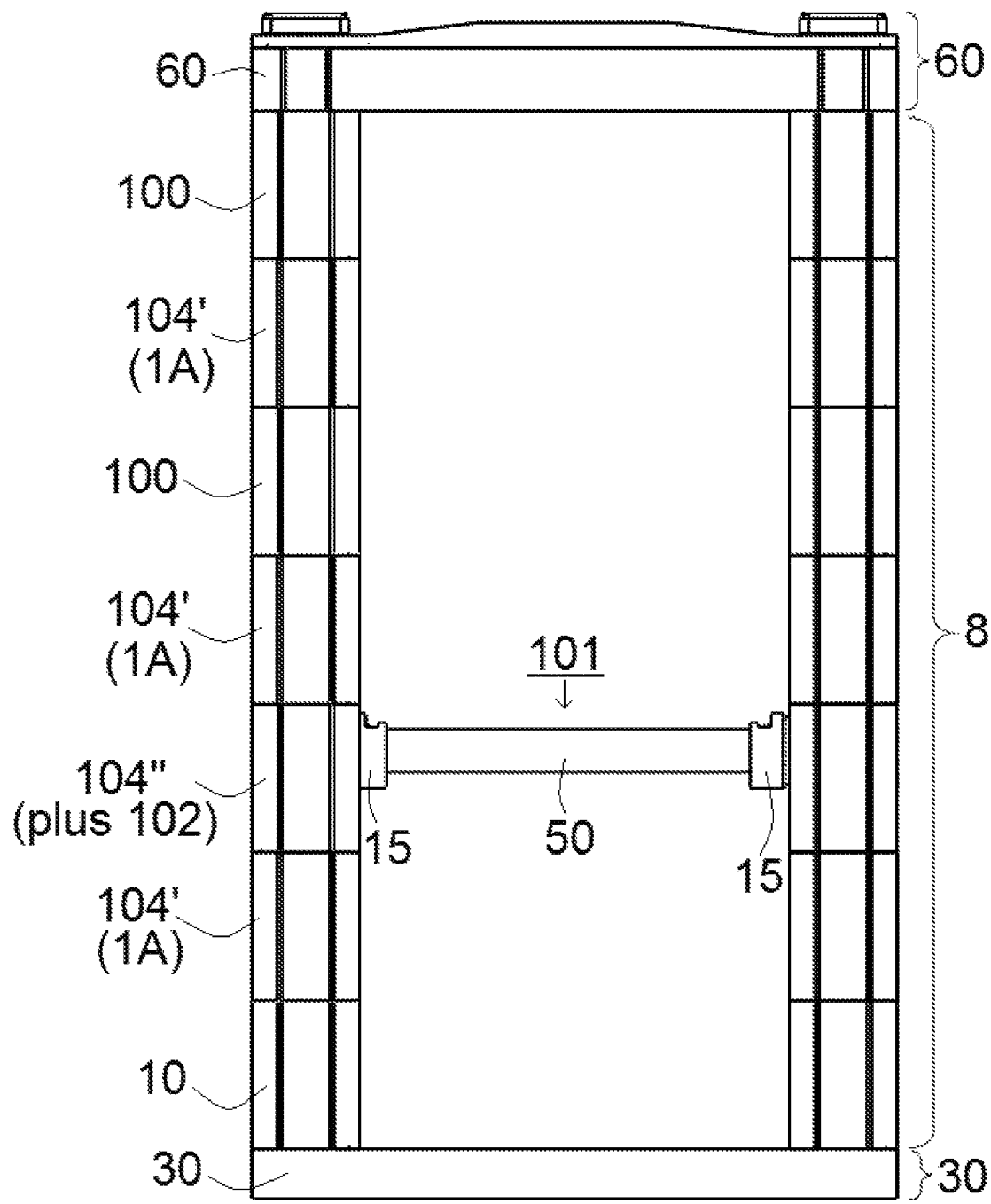
FIG. 27 is an end view of the tunnel assembly shown in FIGS. 25 and 26.
Figure 28:
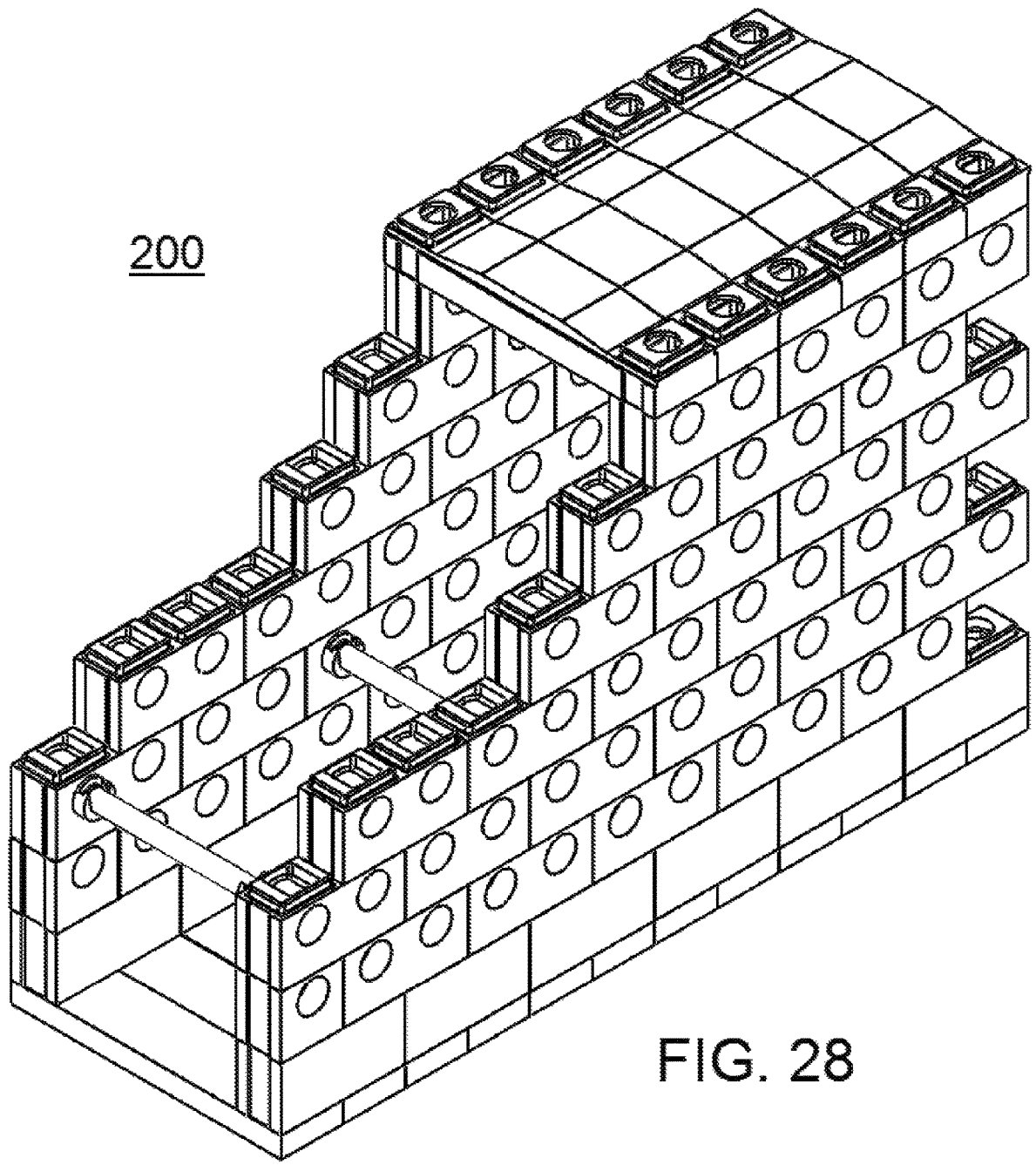
FIG. 28 is a perspective view of the tunnel assembly shown in FIG. 25 with some wall blocks removed to show the location of the tie bars.
Figure 29:
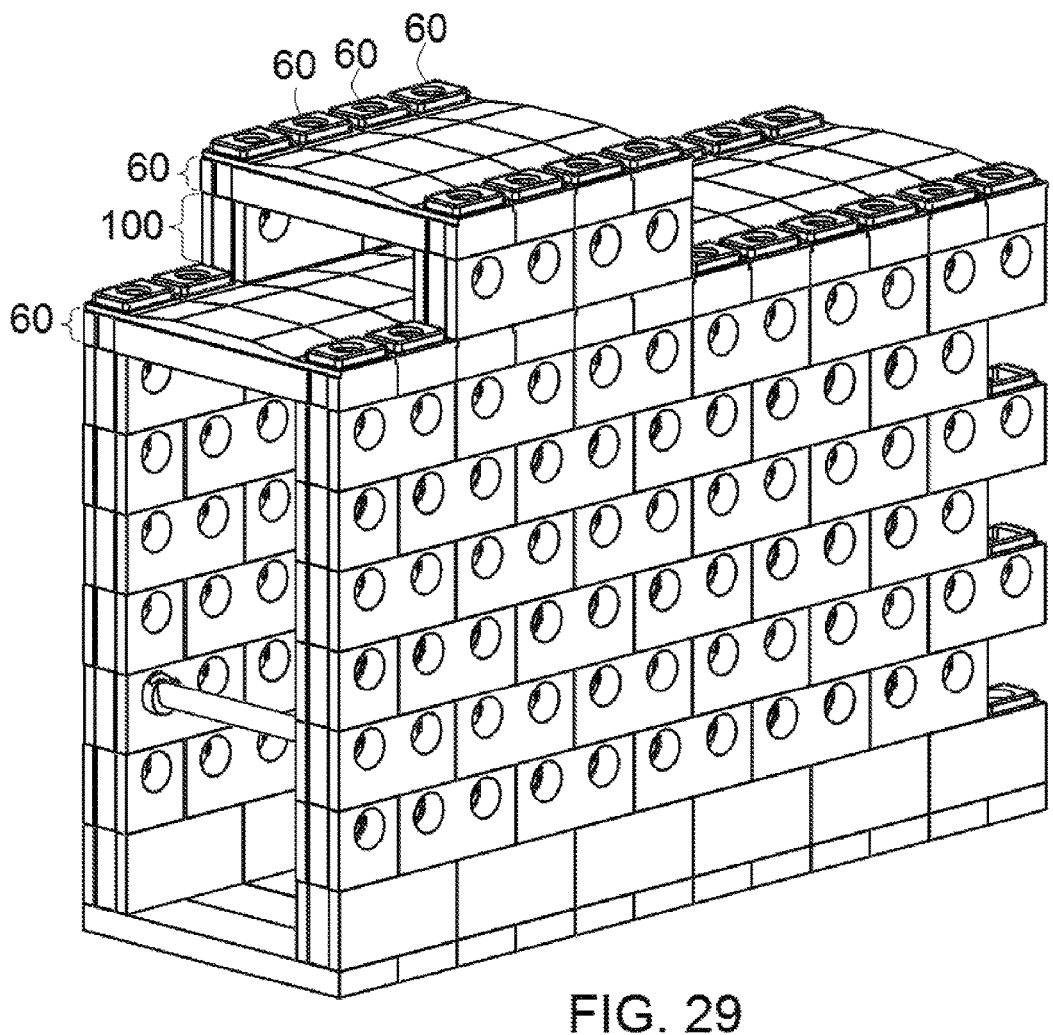
FIG. 29 is a perspective view of the tunnel assembly shown in FIG. 25 built up higher and having double lids.

FIGS. 26 and 27 best illustrate an example of a tunnel 200 including a combination of different blocks 1A, 10 and 100 and defining a number of different refractory assemblies (e.g., 104, 104', 104" and 102). Although this embodiment does not depict a flow directing cap insert member, any of the various refractory inserts according to the present invention can be used in conjunction with any through-hole location in any of the blocks of the tunnel system to define a refractory block assembly within the tunnel assembly, thereby providing a modular system that allows for a universal refractory insert-mating tab to be provided on the surface of the openings of the blocks that are be used in conjunction with any insert in any location in the tunnel. This vast flexibility enables the end user to modify the installation of refractory insert members in any manner that they deem necessary depending on the particular processing conditions and requirements that they face.

While the present invention has been shown and described above with reference to specific examples, it should be understood by those skilled in the art that the present invention is in no way limited to these examples, and that variations and modifications can readily be made thereto without departing from the scope and spirit of the present invention.

What is claimed is:

1. A refractory tunnel assembly for a steam reformer furnace, the tunnel assembly comprising:
a plurality of hollow base components, each said base component comprising a plurality of corresponding mechanical mating members;
a plurality of hollow wall blocks, each said wall block comprising a plurality of corresponding mechanical mating members that further correspond to the mechanical mating members of the base components, wherein at least a portion of the plurality of wall blocks further comprise at least one through-hole having openings formed in opposed side surfaces thereof;
a plurality of hollow lid components, each said lid component comprising a plurality of mechanical mating members that further correspond to said mechanical mating members of said base components and said wall blocks; and
one or more refractory insert members that reside within one or more of the though-holes in said wall blocks;
wherein said base components are arranged to extend in a horizontal arrangement direction defining a width of the tunnel assembly and a longitudinal arrangement direction defining a length of the tunnel assembly;
wherein the wall blocks are stacked upon and mechanically interconnected to the base components via the corresponding mechanical mating members in a vertical arrangement direction and along the longitudinal arrangement direction, and are stacked upon one and mechanically interconnected to another via the corresponding mechanical mating members, without the use of mortar, in both the vertical and longitudinal arrangement directions, to define two parallel tunnel walls, spaced a distance apart from one another in the horizontal arrangement direction, wherein the tunnel walls extend upwardly from the base components in the vertical arrangement direction and along the length of the tunnel assembly on the base components; and
wherein the plurality of lid components are stacked upon and mechanically interconnected to the wall blocks via the mechanical mating members, without the use of mortar, in the vertical arrangement direction and along the longitudinal arrangement direction, so that the lids extend along the longitudinal arrangement direction and the horizontal arrangement direction in order to cover the distance between the tunnel walls along at least a portion of the length of the tunnel assembly.

2. The refractory tunnel assembly according to claim 1, wherein the base components, the wall blocks, the lid components, and the refractory insert members all comprise the same material.

3. The refractory tunnel assembly according to claim 1, further comprising at least one tie bar extending between the tunnel walls in the horizontal extension direction and having a first end located in a portion of a first refractory insert member and a second end located in a portion of an opposed second refractory insert member.

4. The refractory tunnel assembly according to claim 1, wherein the at least one refractory insert member comprises a mechanical mating member that engages a corresponding mechanical mating member provided on an inner surface of the at least one through-hole of the wall blocks.

5. The refractory block according to claim 4, wherein the mechanical mating member of the refractory insert member comprises a slot and channel that mechanically engage a corresponding tab provided on the inner surface of the at least one through-hole of the wall blocks.

6. The refractory assembly according to claim 1, wherein the at least one refractory insert member is at least one of a gas flow changing plug, a gas flow restricting puck, a gas flow changing cap, and a tie bar cradle.

* * * * *